(12) United States Patent
Takahashi et al.

(10) Patent No.: US 10,521,885 B2
(45) Date of Patent: Dec. 31, 2019

(54) IMAGE PROCESSING DEVICE AND IMAGE PROCESSING METHOD

(71) Applicant: Hitachi Kokusai Electric Inc., Tokyo (JP)

(72) Inventors: Masashi Takahashi, Tokyo (JP);
Nobuhiro Chihara, Tokyo (JP);
Muneaki Yamaguchi, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 1447 days.

(21) Appl. No.: 14/399,876

(22) PCT Filed: Apr. 26, 2013

(86) PCT No.: PCT/JP2013/062445
§ 371 (c)(1),
(2) Date: Nov. 7, 2014

(87) PCT Pub. No.: WO2013/168618
PCT Pub. Date: Nov. 14, 2013

(65) Prior Publication Data
US 2015/0161773 A1    Jun. 11, 2015

(30) Foreign Application Priority Data

May 9, 2012   (JP) ................................. 2012-107470

(51) Int. Cl.
*G06T 5/00*     (2006.01)
*H04N 5/217*    (2011.01)
(Continued)

(52) U.S. Cl.
CPC .......... *G06T 5/002* (2013.01); *G06K 9/00791* (2013.01); *G06K 9/38* (2013.01);
(Continued)

(58) Field of Classification Search
CPC ......... G06T 2207/20216; G06T 3/4053; G06T 5/50; G06T 5/006; G06T 5/40;
(Continued)

(56) References Cited

U.S. PATENT DOCUMENTS 5,828,776 A * 10/1998 Lee .................... G06K 9/00127
                                                    382/133
6,683,988 B1 * 1/2004 Fukunaga ............... G06T 9/004
                                                    348/E5.003
(Continued)

FOREIGN PATENT DOCUMENTS

| JP | 6-062283 A | 3/1994 |
| JP | 2010-130291 A | 6/2010 |
| JP | 2011-229030 A | 11/2011 |

OTHER PUBLICATIONS

International Search Report issued in corresponding application No. PCT/JP2013/062445 dated May 31, 2013.
(Continued)

*Primary Examiner* — Aklilu K Woldemariam
(74) *Attorney, Agent, or Firm* — Brundidge & Stanger, P.C.

(57) ABSTRACT

Provided is an image processing apparatus that can reduce degradation in image quality due to heat haze and the like. An input image memory 110 stores an input image group 200 and an input image 210. A time-series smoothed image memory 112 stores a time-series smoothed image 220 obtained by time series smoothing. A moving body removed image memory 113 stores a moving body removed image 230 that is a background image. A histogram analyzing unit 130 computes a differential of histograms of partial images for the input image 210 and the time-series smoothed image 220 or the moving body removed image 230, and calculates similarity information between the images. On the basis of the similarity information, a region dividing unit 140 divides
(Continued)

the input image 210 into a moving body region, and a region other than the moving body region. An image correcting unit 150 performs image synthesis of the input image 210 or the time series-smoothed image 220, for each of the regions.

10 Claims, 21 Drawing Sheets

(51) Int. Cl.
- H04N 5/272 (2006.01)
- G06T 5/40 (2006.01)
- G06T 5/50 (2006.01)
- G06K 9/46 (2006.01)
- G06T 7/20 (2017.01)
- G06K 9/00 (2006.01)
- G06K 9/38 (2006.01)

(52) U.S. Cl.
CPC ............ G06K 9/46 (2013.01); G06K 9/4647 (2013.01); G06T 5/006 (2013.01); G06T 5/009 (2013.01); G06T 5/40 (2013.01); G06T 5/50 (2013.01); G06T 7/20 (2013.01); H04N 5/2171 (2013.01); H04N 5/272 (2013.01); G06K 2009/4666 (2013.01); G06T 2207/20182 (2013.01); G06T 2207/30232 (2013.01)

(58) Field of Classification Search
CPC .... G06T 7/20; G06T 7/74; G06T 7/80; G06T 2207/20021; G06T 7/215; G06T 7/248; G06T 7/10; G06T 7/66; G06T 2207/30004; G06T 2201/0202; G06T 2207/30232; G06T 5/002; G06T 7/001; G06T 2207/10016; H04N 5/23254; H04N 5/23264; H04N 5/272; H04N 5/144; H04N 7/183; H04N 1/413; H04N 1/00031; G06K 9/80; G06K 2009/4666; G06K 9/00791; G06K 9/4647; G06K 9/00577; G06K 9/00771; G06K 9/00335; G06K 9/00765; G06K 9/00127; A61B 6/12; A61B 6/469; A61B 5/1128
USPC ....... 382/100, 112, 131, 154, 224, 103, 173, 382/236, 239
See application file for complete search history.

(56) References Cited

U.S. PATENT DOCUMENTS

| | | | | |
|---|---|---|---|---|
| 8,265,401 | B2* | 9/2012 | Yoshimura | H04N 1/00278 382/166 |
| 8,374,456 | B2* | 2/2013 | Vetro | G06T 3/40 382/260 |
| 2005/0207669 | A1* | 9/2005 | Kameyama | G06T 5/50 382/274 |
| 2006/0245640 | A1* | 11/2006 | Szczuka | G06T 5/50 382/154 |
| 2008/0130964 | A1* | 6/2008 | Zwirn | G06T 5/40 382/128 |
| 2008/0170124 | A1* | 7/2008 | Hatanaka | G06T 5/004 348/208.4 |
| 2010/0128928 | A1 | 5/2010 | Ishiwatari | |
| 2010/0238160 | A1* | 9/2010 | Yea | G06T 3/0093 345/419 |
| 2010/0239180 | A1* | 9/2010 | Yea | G06T 5/002 382/261 |
| 2010/0239187 | A1* | 9/2010 | Yea | G06T 3/40 382/298 |
| 2013/0121546 | A1* | 5/2013 | Guissin | G06T 7/0012 382/128 |
| 2013/0259364 | A1* | 10/2013 | Shindo | G06K 9/4652 382/164 |
| 2014/0226864 | A1* | 8/2014 | Venkatraman | G01C 21/20 382/107 |
| 2015/0139394 | A1* | 5/2015 | Kang | A61B 6/5211 378/62 |
| 2015/0161773 | A1* | 6/2015 | Takahashi | H04N 5/2171 382/173 |
| 2015/0278609 | A1* | 10/2015 | Wu | G06K 9/00785 382/104 |
| 2016/0065864 | A1* | 3/2016 | Guissin | G06T 5/008 348/239 |
| 2016/0323525 | A1* | 11/2016 | Lee | H04N 5/357 |

OTHER PUBLICATIONS

"Image Super-Resolution with Non-Rigid Motion of Hot-air Optical Turbulence," The Journal of the Institute of Image Electronics Engineers of Japan, vol. 37, No. 4, pp. 387 issued on Jul. 25, 2008 by Masao Shimizu et al.

* cited by examiner

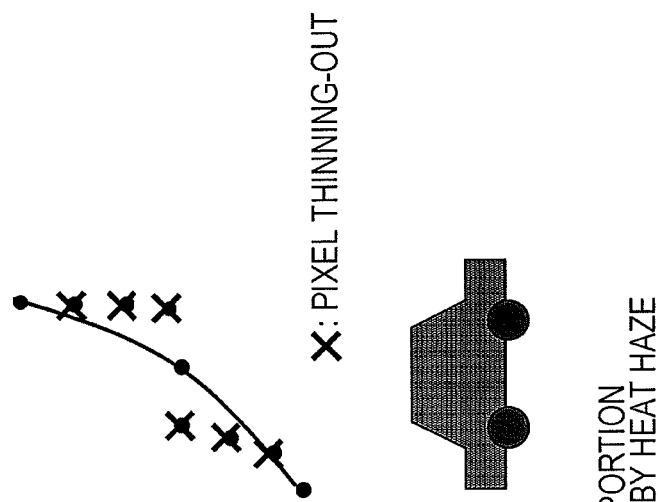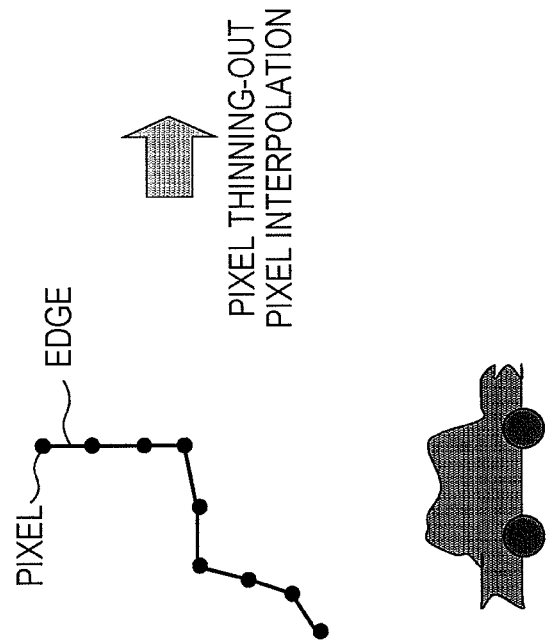

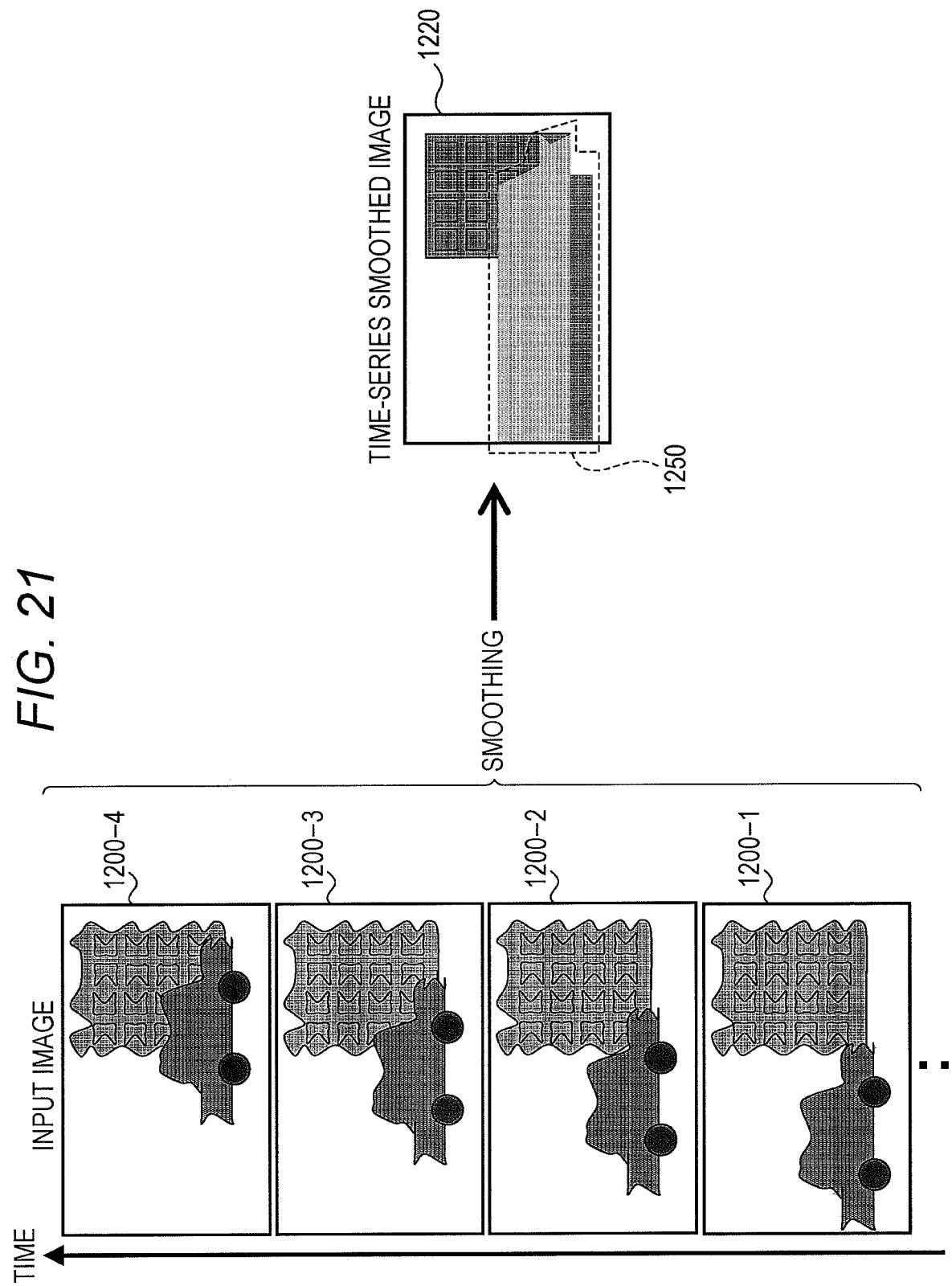

IMAGE PROCESSING DEVICE AND IMAGE PROCESSING METHOD

TECHNICAL FIELD

The present invention relates to an image processing apparatus and an image processing method, and in particular, to an image processing apparatus and an image processing method which reduce image degradation by such as heat haze.

BACKGROUND ART

In recent years, a demand for a monitoring camera for security, site management, or the like has increased, and with the development of semiconductors and network technology, functions of the monitoring camera have been diversified.

From among those, image correction represented by shake correction, gradation correction, or removal of disturbances, for example, fog, rain, snowstorm, yellow dust, smog, or the like, plays an important role in a monitoring field which is easily affected by the atmosphere and illumination change, and until now, has been provided in various products.

Such an image correction is aimed to improve image visibility and increase monitoring efficiency. For example, technology of the shake correction (stabilizer) detects extra movement of an image caused by strong wind or vibration of a camera fixing stand and performs correction in such a way to cancel the extra movement, thereby providing an image having a high visibility.

As one of natural phenomena that considerably decrease the visibility of a monitored image, heat haze can be mentioned. The heat haze is a phenomenon in which refraction/traveling of light is obstructed, occurring due to the temperature difference of the air, or the like. In a place in which heat haze occurs, a subject is deformed as lint balls stand and is viewed as irregularly shaking, and resolution is also reduced. Therefore, the quality of the image is considerably reduced.

In practice, attempts to correct image distortion caused by heat haze or to increase resolution of an image with heat haze have been made.

Relevant technology is to smooth all pixels of a screen by using a plurality of temporal neighboring images (hereinafter, referred to as "time-series smoothing") and relieve deformation of the subject due to heat haze.

That is, time-series smoothing is technology which obtains an image close to an original shape by performing pixels using a plurality of images since it is considered that a displacement amount in a case where the subject is deformed due to the influence of heat haze, statistically has a property according to Gaussian distribution.

For example, referring to Non-patent Literature 1, there is disclosed technology of correcting deformation of a subject due to heat haze by performing position matching on an "input image" that is a target for heat haze correction and an "average image" which is time-series smoothed, and performing correction such that the input image is matched on the average image.

An existing method of correcting heat haze by performing time-series smoothing will be described with reference to FIG. 11.

Input images 1200-1 to 1200-n represent an image group of a plurality of frames which are captured by a monitoring camera or the like and are temporally adjacent to each other. FIG. 11 illustrates the input images 1200-1 to 1200-4 as examples. When such an image includes distortion due to heat haze, the shape of a subject is deformed around a place in which heat haze occurs, thereby leading to reduction in video visibility.

A time-series smoothed image 1220 is an example of an image obtained by smoothing all pixels of a screen by performing smoothing on the input images 1200-1 to 1200-4 in an existing time-series of an image. As in the time-series smoothed image 1220, it is possible to restore an image close to an original shape of a body in a background region in which a body, such as a building, is stationary.

However, when time-series smoothing is performed in a case where a moving body is included in the input image, an image in which a moving body region is unnaturally blurred is generated, and a corrected image is considerably deteriorated. That is, in the example of FIG. 11, there is a problem that, in a region 1250 through which the moving body has passed, the moving body and the region are unintentionally superimposed on each other and a desired result is not obtained.

That is, the time-series smoothing method can be used only when the moving body is not present in the screen.

Also, since resolution is also reduced by the above-described smoothing processing, in addition to missing of resolution due to the influence of heat haze, an attempt to increase resolution of the corrected image has been made.

For example, referring to Non-patent Literature 2, there is disclosed a technology of restoring missed resolution by performing a super-resolution process using a plurality of temporal neighboring images on an image obtained by performing time-series smoothing processing on all pixels of the screen.

Also, referring to Patent Literature 1, there is disclosed an image processing apparatus (hereinafter referred to as related art 3) including a correcting device that performs an operation of applying a transfer function, which is defined by a single coefficient and the image data of a preceding frame, to image data in order to correct image fluctuation in the input image data, a delay device that delays the image data corrected by the correcting device by one frame and feeds the image data back to the correcting device as the image data of the preceding frame, an extracting device that extracts pixels in which movement is present on the image, based on input image data and the image data of the preceding frame, an identifying device that identifies a pixel of a moving body from pixels having fluctuation among the pixels in which the movement is present, and a control device that controls the coefficient according to a result of the identification by the identifying device.

The related art 3 also can reduce influence affecting a moving body and correct image fluctuation.

CITATION LIST

Patent Literature

Patent Literature 1: JP 2011-229030 A

Non Patent Literature

Non Patent Literature 1: S. Yoshimura, M. Shimizu, M. Tanaka, M. Okutomi, "Elimination of Fluctuations from Sequential Images with Non-Rigid Motion Model" 2007, IPSJ SIG Technical Report, 2006-CVIM-157, P. 169-176.

Non Patent Literature 2: M. Shimizu, S. Yoshimura, M. Tanaka, and M. Okutomi, "Super-Resolution form Image Sequence under Influence of Hot-Air Optical Turbulence", 2008, IEEE Computer Society Conference on Computer Vision and Pattern Recognition (CVPR), P. 1-8.

SUMMARY OF INVENTION

Technical Problem

However, the related art 1 has a problem that the corrected image is greatly deteriorated when a moving body is present in a relevant image in a case where time-series smoothing using temporal neighboring images is performed in order to correct heat haze or the like.

Further, according to the related art 1, when time-series smoothing is performed on the entire screen in a case where the moving body is present in the input image, an average image is deteriorated as described above, thereby resulting in bed position matching and therefore, making it impossible to perform correction itself.

Also, the related art 2 has a problem that, in a case where a super-resolution process using a plurality of images is performed for a corrected image, a processing amount for position matching is huge. The reason for this is that deformation due to heat haze occurs locally, for example, accurate position matching needs to be performed in a pixel unit.

Also, the related art 3 corrects fluctuation only with a focus on the position relationship between pixels of an image of a preceding frame and therefore, has a problem that detection accuracy of the moving body region is low.

The present invention is achieved in view of such a situation, and makes it a subject to cancel an above-mentioned subject.

Solution to Problem

An image processing apparatus according to the present invention includes: a similarity information calculating unit configured to calculate similarity information between images by computing a difference between partial images with respect to an input image, and a time-series smoothed image obtained by performing smoothing using a plurality of temporal neighboring images or a moving body removed image from which a moving body is deleted; a region dividing unit configured to divide the input image into a moving body region and a region other than the moving body region based on the similarity information between images; and an image correcting unit configured to perform image synthesis on the input image or the time-series smoothed image for each region.

In the image processing apparatus according to the present invention, the region dividing unit is configured to: set two or more threshold values which are different in magnitude, perform region division on the region placed spatially adjacent to the region having a pixel value equal to or greater than a high threshold value by using a low threshold, and otherwise, performs region division by using the high threshold, or perform region division on the region placed spatially adjacent to the region having an evaluated value equal to or less than a low threshold value by using a high threshold value, and otherwise, perform region division by using the low threshold value.

In the image processing apparatus according to the present invention, the image correcting unit is configured to execute a spatial-direction smoothing filter for the moving body region.

The image processing apparatus according to the present invention further includes an image quality enhancing unit configured to perform position matching between the moving body regions and/or the regions other than the moving body, and performing super-resolution processing based on a result of the position matching.

An image processing method according to the present invention of causing a computer to perform image processing, includes calculating similarity information between images by computing a difference between partial images with respect to an input image, and a time-series smoothed image obtained by performing smoothing using a plurality of temporal neighboring images; dividing the input image into a moving body region and a region other than the moving body region based on the similarity information between images; and performing image synthesis on the input image or the time-series smoothed image for each region.

Advantageous Effects of Invention

According to the present invention, it is possible to provide an image processing apparatus which appropriately corrects deformation of a subject to be viewed by the influence of heat haze or missing of resolution, increases accuracy of position matching, and obtains a high-quality image by computing a difference between the input image and a partial image of the comparative image and therefore identifying a mobbing body.

BRIEF DESCRIPTION OF DRAWINGS

FIG. 16 is a conceptual diagram of an edge smoothing filter in the image correcting process according to the first embodiment.

FIG. 21 is a conceptual diagram of image processing by time-series smoothing for reduction in heat haze in the related art.

DESCRIPTION OF EMBODIMENTS

<Principle of Image Processing Apparatus According to Embodiment>

First, principle of an image processing apparatus according to an embodiment of the present invention will be schematically described with reference to FIG. 1.

Figure 1:
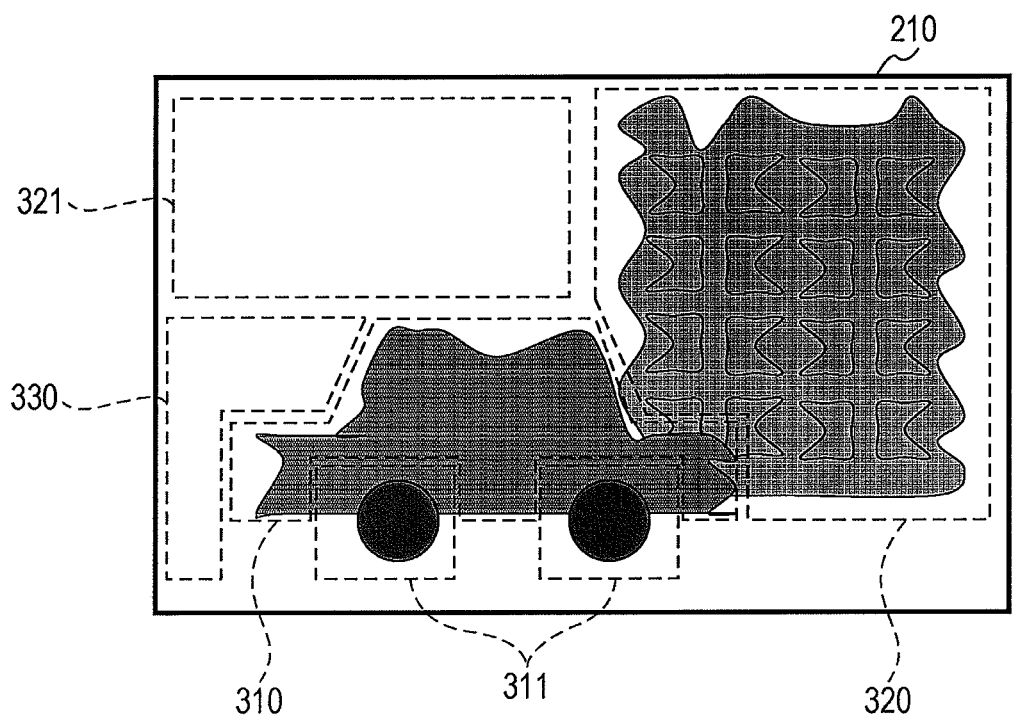
FIG. 1 is a view explaining an example of categories for regions in an image with heat haze to be subjected to an image processing method of the present invention.

In FIG. 1, there is illustrated an example of an image including heat haze to be subjected to processing by the image processing apparatus according to the embodiment. An input image 210 is one of frames which are captured at predetermined time intervals by an imaging device, such as a monitoring camera, and in which a traveling vehicle and a building are captured. It can be understood that in the input image 210, at least a moving body region and a background region can be distinguished from each other due to at least a difference of subjects.

The image processing apparatus according to the embodiment divides, for example, the input image 210 into three categories of regions including "a moving body region", "a background region", and "a quasi moving body region"

The "moving body region" is a region in which the moving body (for example, vehicle) is present in the input image. The "moving body region" includes a region 310 (vehicle body) in which heat haze occurs on the moving body and a region 311 (vehicle wheels) in which heat haze does not occur on the moving body.

The "background region" is a region in which a body (for example, building) is stationary. The "background region" includes a region 320 in which heat haze occurs on the stationary body and a region 321 in which heat haze does not occur on the stationary body.

The "quasi moving body region" is a region 330 in which the moving body is not present in the input image and through which the moving body has passed.

As described above, movement of the subjects due to heat haze may be detected in not only the regions 310 and 311 which belong to the "moving body region", but also the region 320 which belongs to the category "background region".

In the related art, it is difficult to accurately distinguish the "moving body region" and the "background region" in which heat haze occurs. Accuracy is poor, that is, determination is erroneously performed that the moving body is present in "the background region", thereby greatly reducing quality of a corrected image.

The image processing apparatus according to the embodiment focuses attention on histogram characteristics of being robust to deformation of a body, and evaluates a difference (cost) between histograms of partial images.

Therefore, it is possible to perform image correction in a state of distinguishing the "moving body region" from the "background region" in which heat haze occurs and performing image division according to the respective categories, which has been difficult in the related art. In this way, image quality is improved.

Specifically, the image processing apparatus performs appropriate processing for respective regions and again synthesizes the images of the respective regions, thereby achieving correction for heat haze.

For example, the image processing apparatus performs smoothing using spatial neighboring pixels on the moving body region and performs smoothing using temporal neighboring images on the remaining regions.

The image processing apparatus calculates a histogram difference between the input image 210 and a time-series smoothed image obtained by smoothing the input image using an input image group 200 including temporal neighboring images by using for example, a histograms having characteristics robust to deformation of a body, upon division of the moving body. The image processing apparatus extracts a portion in which the difference is small, as the moving body region.

Thereafter, the image processing apparatus performs correction for heat haze and performs super-resolution processing, on the respective divided regions of the categories, thereby improving image quality. The image processing apparatus refers to a result of the above-described extraction of the moving body even in the case of performing alignment for the super-resolution processing. Thus, since a place in which the subject is present is limited, search is performed only among moving body regions and only among regions other than moving body, a search range is limited, thereby reducing a processing amount.

EXAMPLE 1

<First Embodiment>
[Configuration of Image Processing Apparatus 10]

First, a configuration of the image processing apparatus 10 (computer) according to a first embodiment of the present invention will be described with reference to FIG. 2

An example of the image processing apparatus 10 mainly includes an input image memory 110 (input image storage device), a time-series smoothed image memory 112 (time-series smoothed image storage device), a moving body removed image memory 113 (moving body removed image storage device), an output image memory 114 (output image storage device), a computation memory 115 (temporary storage device), a time-series smoothed image updating unit 120 (time-series smoothed image updating device), a histogram analyzing unit 130 (similarity information calculating device, similarity information calculating unit, histogram analyzing device), a region dividing unit 140 (region dividing device), an image correcting unit 150 (image correcting device), a moving body removed image updating unit 160 (moving body removed image updating device), a heat haze distortion computing unit 170 (heat haze distortion computing device), a parameter optimizing unit 180 (parameter optimizing device), and an image quality enhancing unit 190 (image quality enhancing device).

The image processing apparatus 10 includes the memories of the input image memory 110 to the computation memory 115, and a processor, such as a digital signal processor (DSP) or a graphics processing unit (GPU) as hardware, and the processor which loads a predetermined program, realizes functions of the time-series smoothed image updating unit 120 to the image quality enhancing unit 190, thereby functioning as a heat haze correcting apparatus which corrects fluctuation due to heat haze or the like with respect to an image acquired from a monitoring camera or the like.

The input image 210 from the monitoring camera (not illustrated) or the like is frequently recorded in the input image memory 110. Generally, since the image acquired from the monitoring camera is encoded as a still image, such as a JPG (Motion JPEG) or a Jpeg 2000, or as a moving image, such as MPEG4 or H.264, the image is appropriately encoded and stored as RAW data having a predetermined color format.

The input image memory 110 preferably holds a new image at least by one frame in a complete form and for this purpose, has a capability equal to or larger than a capability for two frames. Also, when the super-resolution process of the image quality enhancing unit 190 requires the input image group 200, the input image memory 110 preferably holds more still image data (frames) temporally adjacent to the input image 210. RAW data is a bitmap data or an original-format data expressed by respective values 8 bits/16 bits of, for example, RGB (red, green, blue) or the like.

The time-series smoothed image memory 112 is a recording medium storing a time-series smoothed image 220 obtained by smoothing all pixels of a screen by using a plurality of temporal neighboring input images.

The time-series smoothed image memory 112 stores the time-series smoothed image 220 which is generated and updated by the time-series smoothed image updating unit 120.

The moving body removed image memory 113 is a recording medium which stores a moving body removed image 230 that is "a background image" in which time-series smoothing processing is performed on an image obtained by deleting a moving body from the input image. The moving body removed image 230 is generated by the moving body removed image updating unit 160 and is recorded in the moving body removed image memory 113.

The time-series smoothed image 220 or the moving body removed image 230 does not need to be held in the memory 112 or 113 in the form of one frame formed of pixels at the same time point as a complete form, and an image including a newly updated portion and a previously updated portion even is not very problematic.

The output image memory 114 is a recording medium that eventually stores an output image 240 on which image quality enhancing processing is performed.

The computation memory 115 is a recording medium for storing other temporary data, a parameter, or the like upon image processing of the present embodiment.

The computation memory 115 is capable of being accessible by respective control computation parts and can store cost computation information 252 (FIG. 8), mask setting 253 (FIG. 10), corrected images 254 and 256 (FIG. 14), filter information 255 (FIG. 15), distortion strength image 257 (FIG. 17), heat haze distortion level DL (FIG. 17), and data or the like for use in computation.

Further, the cost computation information 252 is capable of storing an evaluated cost $C_S$ (FIG. 9), an evaluated cost $C_R$ (FIG. 9), mask information $M_{SR}$ (FIG. 10) or the like.

Figure 3:
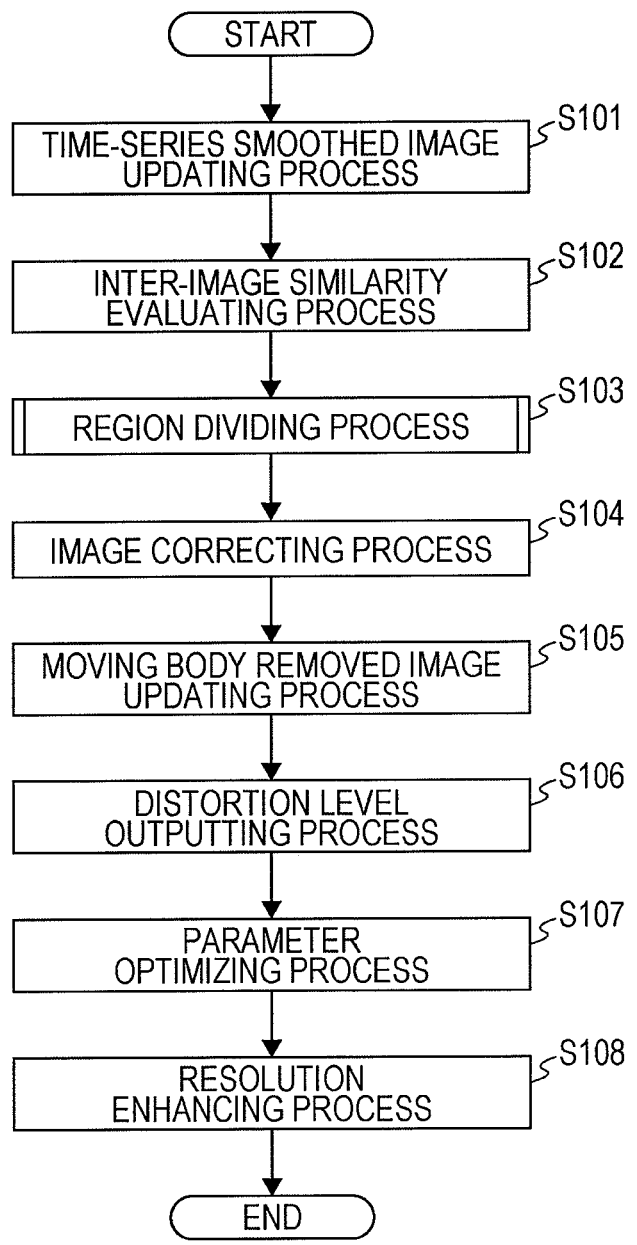
FIG. 3 is a flowchart of an image quality enhancing process according to the first embodiment.

Also, the mask setting 253 is capable of storing a threshold parameter and category settings. The threshold parameter is capable of storing thresholds T1 and T2 (FIG. 10) for a region dividing process (FIG. 3). Also, the category setting is data defining values representing the "moving body region", the "background image", and the "quasi moving body region" on the memory with respect to the "moving body region", the "background image", and the "quasi moving body region" which are three types of categories into which an image is divided.

In addition, the computation memory 115 also stores coordinates (i, j), a variable Tc associated with a threshold, or the like.

Details of the data will be described below.

The input image memory 110, the time-series smoothed image memory 112, the moving body removed image memory 113, the output image memory 114, and the computation memory 115 can be realized by using a work memory and a graphic memory which are embedded in a chip for RAM, a digital signal processor (DSP), or a graphics processing unit (GPU). The input image 210 and the output image 240 which are held in the input image memory 110 and the output image memory 114 may be transferred to another memory by using a direct memory access (DMA) or the like, or may be input to or output from another device through a bus, an external output terminal, a network, or the like.

As the other device, an image display apparatus (not illustrated) or an image analysis apparatus (not illustrated) which uses a personal computer (PC) can be used.

The time-series smoothed image updating unit 120 is triggered at predetermined time intervals, performs time-series smoothing of the input image 210, and stores a generated time-series smoothed image 220 in the time-series smoothed image memory 112. The smoothing can be performed by using a current time-series smoothed image 220. For example, it is possible to smooth image data of several frames at a predetermined interval of 1/30 seconds to dozens of minutes.

The histogram analyzing unit 130 is a characteristic control computation part of the first embodiment. In order to determine similarity between images, the histogram analyzing unit 130 generates histograms for respective windows (partial images distinguished by a grid shape) and computes a difference between the histograms. Specifically, the histogram analyzing unit 130 generates evaluated costs $C_S$ and $C_R$ (FIG. 9) or the like, which are similarity information between the input image 210 and the time-series smoothed image 220 that is a comparative image or the moving body removed image updating unit 160 and stores or directly transfer the evaluated costs $C_S$ and $C_R$ in the computation memory 115 or to the region dividing unit 140.

In this case, the histogram analyzing unit 130 evaluates similarity (cost) for a partial image in a predetermined range (hereinafter, referred to as "window")

The region dividing unit 140 is a control operation part which is characteristic in the first embodiment and divides the input image 210 into predetermined categories based on evaluated costs $C_S$ and $C_R$ that are similarity information between images, calculated by the histogram analyzing unit 130. Thus, respective window are classified into relevant categories according to a moving body, a background, or the like. In practice, the region dividing unit 140 generates mask information $M_{SR}$ (FIG. 10) as region division information representing into which category each window is classified, and stores the mask information $M_{SR}$ in the computation memory 115.

Figure 14:
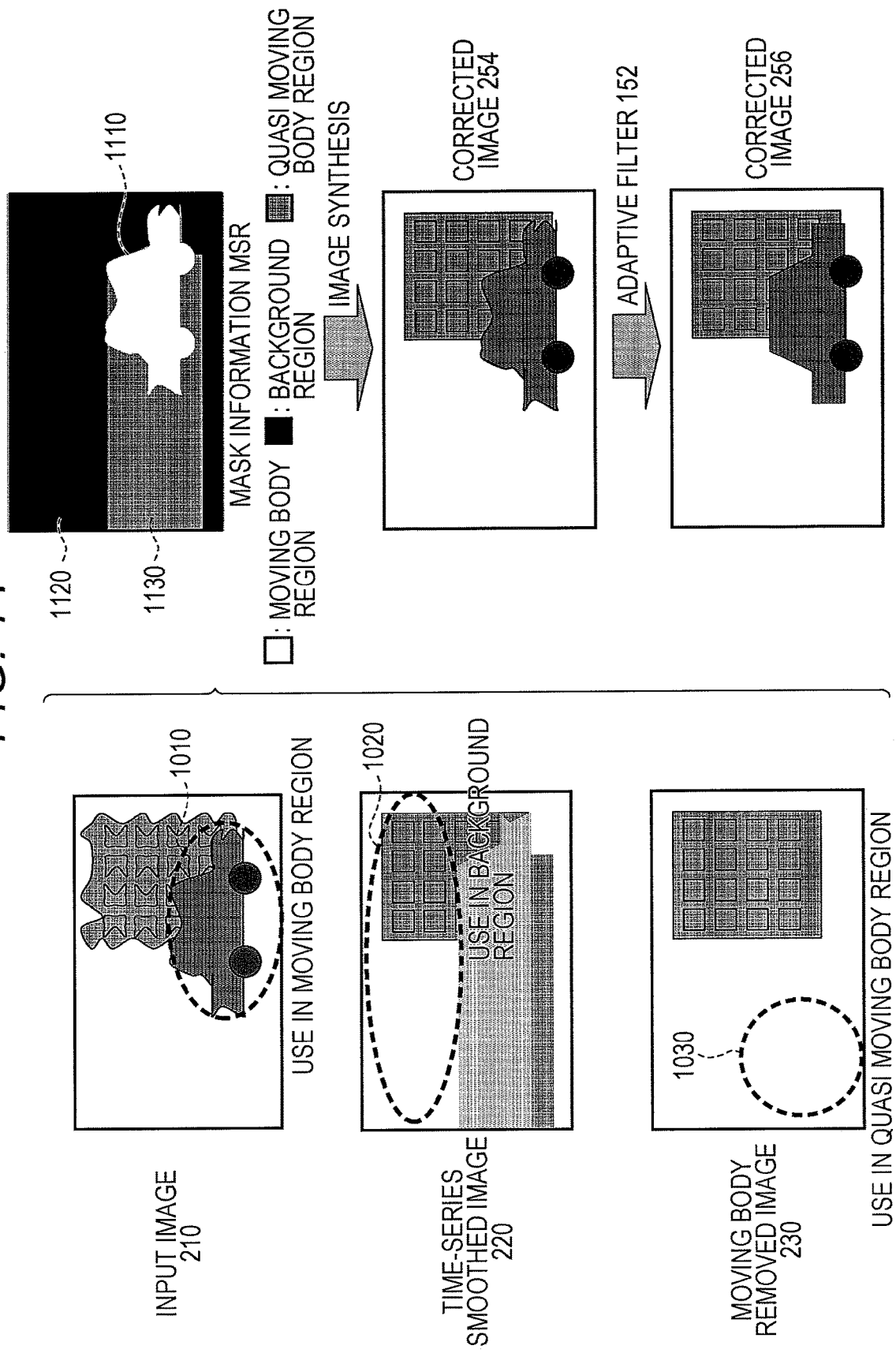
FIG. 14 is a conceptual diagram of an image correcting process according to the first embodiment.

The image correcting unit 150 is a control operation part which is characteristic in the first embodiment and generates the corrected image 254 by using a source image or an image filter (hereinafter, referred to as a "filter") which is different according to the categories, based on the mask information $M_{SR}$ that is a result of the region division. Depending on a situation, the image correcting unit 150 selects the input image 210 for the "moving body region" and executes a smoothing filter in spatial domain, selects the time-series smoothed image 220 for the "background region" and executes a smoothing filter in time domain, and selects the moving body removed image 230 for the "quasi moving body region" and executes the smoothing filter in time domain. Thereafter, the image correcting unit 150 combines images of the respective regions and synthesizes the corrected image 254 (FIG. 14).

The image correcting unit 150 then executes a spatial domain filter for the corrected image 254, generates the corrected image 256, and stores the corrected image 256 in the computation memory 115.

The moving body removed image updating unit 160 is a control operation part that updates the moving body removed image 230 by using the mask information $M_{SR}$ and the input image 210.

The moving body removed image updating unit 160 stores the generated moving body removed image 230 in the moving body removed image memory 113 by using a moving average or the like.

The heat haze distortion computing unit 170 calculates a distortion strength due to heat haze based on results of the region division and the image correction. The heat haze distortion computing unit 170 calculates the image distortion strength image 257 due to heat haze by using the input image 210, the mask information $M_{SR}$ and the corrected image 256, stores the image distortion strength image 257 in the computation memory 115, and again calculates a heat haze distortion level DL (FIG. 17) from the image distortion strength image 257.

The parameter optimizing unit 180 is a control operation part that optimizes various parameters according to a strength of distortion due to heat haze. The parameter optimizing unit 180 optimizes various parameters for performing region division or image updating, from the heat haze distortion level DL and stores the various parameters in the computation memory 115.

The image quality enhancing unit 190 is a control operation part that performs a super-resolution process based on the results of the region division and the image correction.

The image quality enhancing unit 190 first performs position matching by using the input image 210, the corrected image 254 or 256, and a plurality of frames temporally adjacent to the input image group 200. The position matching is performed only between the moving body regions or between regions other than the moving body by referring to the mask information $M_{SR}$. Thus, a processing amount of the position matching can be reduced.

Thereafter, the image quality enhancing unit 190 performs the super-resolution process and stores the output image 240 of which the background region has been subjected to a high quality enhancing process in the output image memory 114.

Also, the respective parts of the image processing apparatus 10 of the present embodiment may be implemented as dedicated circuits, or may have a configuration in which a control device performs programs store in a storage device as the above-described respective devices. In the former case, the image processing apparatus 10 may be implemented by circuits using an application specific integrated circuit (ASIC), a field-programmable gate array (FPGA), or the like. In the latter case, the image processing apparatus 10 may be implemented by programs which are executed by a computer including a control operation device, such as a central processing unit (CPU) or a micro processing unit (MPU) which is provided in a PC, in addition to a DSP or a GPU, and a storage device, such as RAM, ROM, flash memory, or HDD, as hardware resources.

Also, the above-described storage device may include, for example, an optical recording medium including a DVD or the like, or a detachable recording medium, such as a semiconductor storage medium including a USB memory, a SD card, or the like. Also, it is possible to store various programs and data in the detachable recording medium and install the detachable recording medium as an embedded recording medium. Further, it is possible to store the input image 210 or the output image 240 in the detachable recording medium and view the input image 210 or the output image 240 through a separate PC, a mobile telephone or the like.

Further, the image processing apparatus 10 of the present embodiment includes a CCD or CMOS image sensor or the like, and may include an imaging device, such as a camera that captures a still image or a moving image.

Further, the image processing apparatus 10 of the present embodiment may include a network transmission and reception device, such as a LAN board or a portable communication portion, which obtains a still image or a moving image from a network and transmits the output image 240.

Further, the image processing apparatus 10 may include a display device, such as a liquid crystal display, for checking of respective images, parameters and an imaging state.

In addition, the image processing apparatus 10 may include an input device, such as a keyboard, a mouse, or a touchpad and detect an instruction of a user for control of the respective parts.

[Image Quality Enhancing Process by Image Processing Apparatus 10]

Next, an image quality enhancing process of the present embodiment will be described step by step with reference to a flowchart in FIG. 3. The following processing is performed using hardware resources by the respective parts of the image processing apparatus 10 illustrated in FIG. 2. In order to facilitate understanding, each step is assumed to perform processing in a frame unit. That is, image data of one frame is received, processed, and transferred to a subsequent step.

First, in step S101, the time-series smoothed image updating unit 120 performs a time-series smoothed image updating process.

Specifically, the time-series smoothed image updating unit 120 generates the time-series smoothed image 220 by using the input image 210 stored in the input image memory 110, stores the time-series smoothed image 220 in the time-series smoothed image memory 112 and updates the time-series smoothed image 220.

The time-series smoothed image updating unit 120 performs time-series smoothing for respective pixels by using a computation formula due to a moving average illustrated in, for example, Formula (1), in order to generate the time-series smoothed image 220.

[Mathematical Formula 1]

$$a(i,j)=s \times a(i,j)+(1-s) \times p(i,j) \quad \text{Formula 1}$$

Where a(i, j) denotes a pixel value at coordinates (i, j) on the time-series smoothed image, p(i, j) denotes a pixel value of the input image at the same coordinates (i, j), s denotes an update parameter (0<s<1), and the equal sign denotes an operator which substitutes the left side to the right side (the same shall apply hereinafter).

The pixel values p(i, j) and a(i, j) may have any form as long as they are identical to each other. However, the time-series smoothed image updating unit 120 may perform time-series smoothing respectively, for example, for each pixel in Formula (1), with respect to component values of three colors R (red), G (green) and B (blue) in a RGB color space or respective component values of an HSV (hue, saturation, value) color space.

Also, the time-series smoothed image updating unit 120 can accelerate the process by using a black-and-white input image 210 or by performing time-series smoothing only on a G component value of RGB and a brightness component value of HSV.

Also, it is preferable to use the input image itself as an initial value of a(i, j), that is, a time-series smoothed image of the first frame, as in Formula (2).

Further, it is possible to select, as the initial value of a(i, j), an image of a frame temporally adjacent to the input image 210 from the input image group 200.

[Mathematical Formula 2]

$$a(i,j)=p(i,j) \quad \text{Formula (2)}$$

Further, the time-series smoothed image updating unit 120 may use a process other than the above-described moving average, as a method of generating the time-series smoothed image 220.

For example, the time-series smoothed image updating unit 120 may set a central value of pixel values at the same coordinates of a plurality of frames as a pixel value at the coordinates in the time-series averaged image.

Further, the time-series smoothed image updating unit 120 may use various background modeling methods which have been developed in order to realize, for example, a robust background difference even without performing the time-series smoothing process. The background modeling method is a method of modeling distribution of background colors or the like as a criterion of background likelihood in a pixel unit or in a region unit. The background modeling method uses a value having the highest background likelihood, such as a center value of modeled background distribution, as a target pixel value. Therefore, it is possible to generate a background which is more accurate than that of the case of using the time-series smoothed image, that is, a background including no moving body.

As the background modeling method, it is possible to use various known methods, for example, "Shimada, Arita, Taniguchi; Fast dynamic control of adaptive mixture-of-Gaussian background models, the institute of electronics information and communication engineers (IEICE) Journal D, Vol. J90-D, 9, pp. 2606-2614, 2007". The method of the background modeling technology performs modeling of a distribution of background colors by a plurality of Gaussian distributions in a pixel unit. Also, it is possible to realize a robust background distribution by updating model parameters, such as the number of Gaussian distributions, or an average, covariance, and weight of each distribution, in a frame unit.

Next, in step S102, the histogram analyzing unit 130 performs an inter-image similarity evaluating process.

In this process, the histogram analyzing unit 130 evaluates a cost corresponding to a difference (non-similarity) between images in a pixel unit and outputs a result of the evaluation to the region dividing unit 140.

Referring to FIGS. 4 to 9, the histogram analyzing unit 130 calculates and evaluates similarity information between images with respect to the input image 210 stored in the input image memory 110 and a comparative image.

The comparative image is the time-series smoothed image 220 stored in the time-series smoothed image memory 112 and the moving body removed image 230 that is a background image stored in the moving body removed image memory 113, and respective pieces of similarity information (evaluated costs $C_S$ and $C_R$) are calculated.

In this case, when there is the moving body removed image 230 already generated in a moving body removed image updating process which will be described below, the histogram analyzing unit 130 can use the moving body removed image 230.

Figure 4:
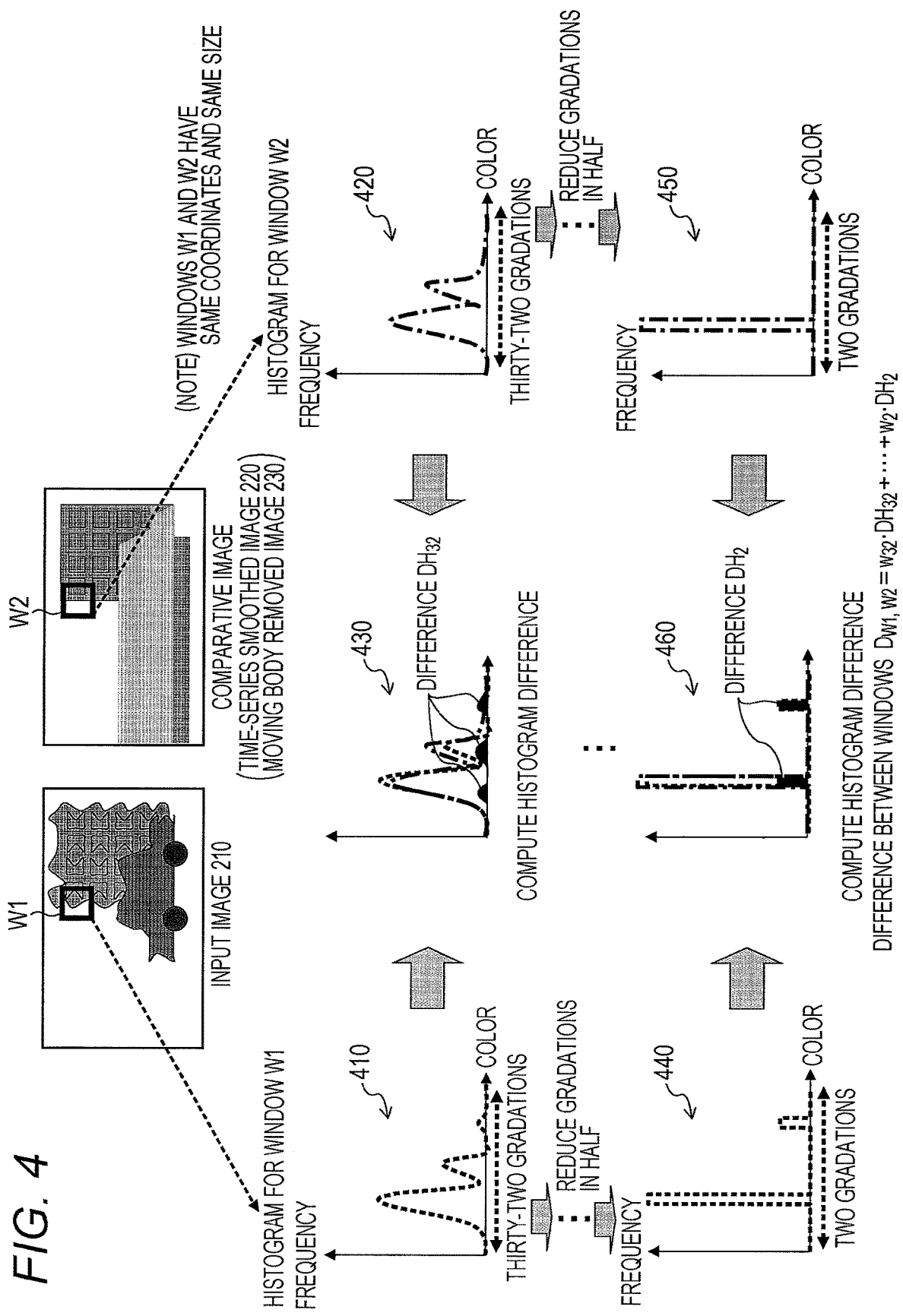
FIG. 4 is a conceptual diagram regarding a difference between histogram in an inter-image similarity evaluating process according to the first embodiment.

FIG. 4 illustrates a method of computing similarity in a certain region.

The histogram analyzing unit 130 generates histograms for the input image 210 and the comparative image by using windows W1 and W2, and computes a difference therebetween. The windows W1 and W2 are partial images which have the same coordinates and the same size, for example, 32 pixels×32 pixels.

The histogram analyzing unit 130 may use any method as a histogram generating method and a difference computing method, and may use, for example, the following method.

For example, the histogram analyzing unit 130 reduces gradations of respective component values within the window, with respect to respective component values of each of the input image 210 and the comparative image, and calculates the difference.

Specifically, for example, the histogram analyzing unit 130 performs quantization up to thirty-two gradations and then generates histograms 410 and 420, with respect to the respective windows W1 and W2. In each histogram, a horizontal axis represents component values and a vertical axis represents frequencies. Thereafter, the histogram analyzing unit 130 calculates a difference in number of pixels between the respective component values of the histograms 410 and 420. The difference in number of pixels of the thirty-two gradations is referred to as a histogram difference $DH_{32}$.

Next, the histogram analyzing unit 130 reduces the number of gradations in half, and generates histograms of the input image 210 and the comparative images The histogram analyzing unit 130 performs the process as described above until the number of gradations becomes two, to compute respective histogram differences $DH_n$ (n=32, 16, 8, 4 and 2).

Subsequently, the histogram analyzing unit 130 computes the histogram difference $D_{W1,W2}$ between the windows W1 and W2 according to the following Formula (3).

[Mathematical Formula 3]

$$D_{W1,W2}=w_{32} \times DH_{32}+w_{16} \times DH_{16}+ \ldots +w_2 \times DH_2 \quad \text{Formula (3)}$$

Where $w_n$ (n=32, 16, 8, 4 and 2) represents a weight for the number n of gradations.

As expressed in Formula (3), by using the histogram differences due to a plurality of gradations, evaluation is possible which greatly reflects a difference in components from which pixel values are separated on the histogram. For example, it is possible to detect even a body which is very small compared with the size of a window, as long as the body has a different property from a background.

Further, the histogram analyzing unit 130 may compute the histogram difference $D_{W1,W2}$ by using only a histogram difference according to a specific number of gradations.

For example, the following Formula (4) is an example in which the histogram difference $D_{W1,W2}$ is calculated by using only the histogram difference of the number 32 of gradations.

[Mathematical Formula 4]

$$D_{W1,W2} = DH_{32} \quad \text{Formula (4)}$$

Also, the histogram analyzing unit 130 may calculate the histogram difference $DH_n$ in any way. However, it is preferable to calculate the histogram difference $DH_n$ as the sum of histogram differences $DDH_n(k)$ (k=1, ..., n) for the respective component values, for example, as expressed in Formula (5).

[Mathematical formula 5]

$$DH_n = \sum_k DDH_n(k) \quad \text{Formula (5)}$$

Figure 5:
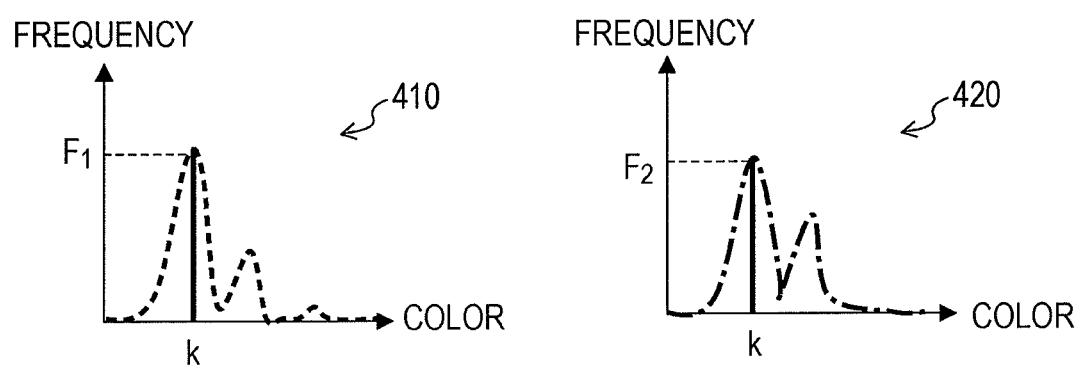
FIG. 5 is a conceptual diagram of a specific example of a method of calculating a histogram difference in the inter-image similarity evaluation process according to the first embodiment.

FIG. 5 illustrates a specific example of a method of computing a histogram difference.

The histogram analyzing unit 130 calculates a difference between F1 and F2 that are frequency values of the number of pixels or the like with respect to each component k at a relevant gradation, between the histogram 410 and the histogram 420.

The histogram analyzing unit 130 may calculate the histogram difference $DDH_n(k)$ for each component value k in any way. However, it is preferable to use an normalization error, for example, as expressed in Formula (6).

[Mathematical formula 6]

$$DDH_n(k) = \frac{|F1 - F2|}{\text{MAX}(F1, F2, K)} \quad \text{Formula (6)}$$

In Formula (6), F1 is a value of the histogram at a component value k of the window W1, F2 is a frequency value, such as the number of pixels, at a pixel value k of the window W2, "MAX( )" is a function that returns the maximum value, and K is an integer for mitigating influences of noise data.

By using the normalization error as in Formula (6), a moving body having a pixel value which is not present in the background region is easily identified, thereby making it possible to detect even a body which is very small compared with the size of a window, for example.

Further, the histogram analyzing unit 130 may compute the $DDH_n(k)$ by merely a difference between histograms for a luminance value k as expressed in the following Formula (7).

[Mathematical Formula 7]

$$DDH_n(k) = |F1 - F2| \quad \text{Formula (7)}$$

Figure 6:
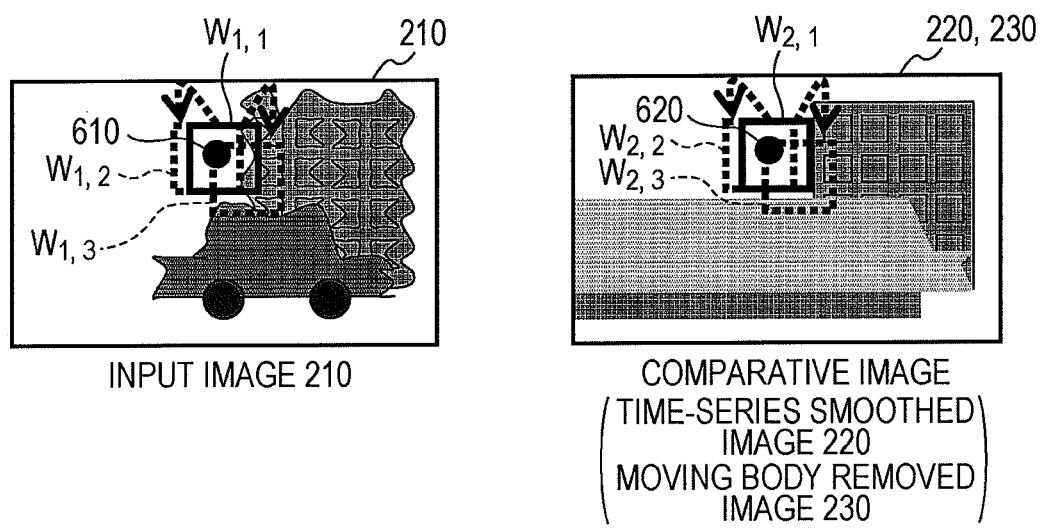
FIG. 6 is a conceptual diagram of computation of an evaluated cost $C_X$ in the inter-image similarity evaluating process according to the first embodiment.

FIG. 6 illustrates an example of a method of computing the evaluated cost $C_S$ or $C_R$ (hereinafter, refers any of the evaluated costs $C_S$ and $C_R$ as an evaluated cost $C_X$) indicating a difference between images at each pixel by using the histogram difference $D_{W1,W2}$ which is computed by the above-described method.

The histogram analyzing unit 130 of the present example repeatedly performs analysis while moving a window around a target pixel. For example, the histogram analyzing unit 130 first sets a window such that the target pixel X is a center, moves the window in a range within which the target pixel X is continuously included and computes histogram differences repeatedly. In the example of FIG. 6, as the target pixel, a pixel 610 is set in the input image 210, and a pixel 620 is set in the comparative image.

In the input image 210 and the comparative image, when k types of windows are set, the evaluated cost $C_X$ for the target pixel X is computed as expressed the following Formula (8).

[Mathematical formula 8]

$$C_X = \sum_t D_{W_{1\_t}, W_{2\_t}} \quad \text{Formula (8)}$$

In Formula (8), windows of the input image 210 are windows $W_{1\_1}, W_{1\_2}, \ldots, W_{1\_k}$, and windows of the comparative image are windows $W_{2\_1}, W_{2\_2}, \ldots, W_{2\_k}$. Also, a window $W_{1\_t}$ and a window $W_{2\_t}$ (t=1, 2, ..., k) have the same size and the same coordinates. For example, in a case where a window is 32 pixels×32 pixels and is moved from the coordinates of the target pixel X for each pixel in a range of −31 pixels to +31 pixels to set the windows $W_{1\_t}$, $W_{2\_t}$, k=63×63=3969. In practice, since a result of $D_{W1\_t, W2\_t}$ can be again used for another target pixel, $D_{W1\_t, W2\_t}$ may be obtained by at most a number equal to the number of pixels within one frame, as described below with reference to FIG. 8.

Formula (8) represents that, as the evaluated cost $C_X$ decreases, similarity between images increases. By repeatedly performing computing while shifting a window to obtain a sum as expressed by Formula (8), it is possible to relieve the influence of a case in which an error unintentionally increases, when deformation of a subject caused by heat haze occurs, for example, when the window is located at edges between a body and a body.

Note that the histogram analyzing unit 130 may calculate the evaluated cost $C_X$ according to another method.

Figure 7:
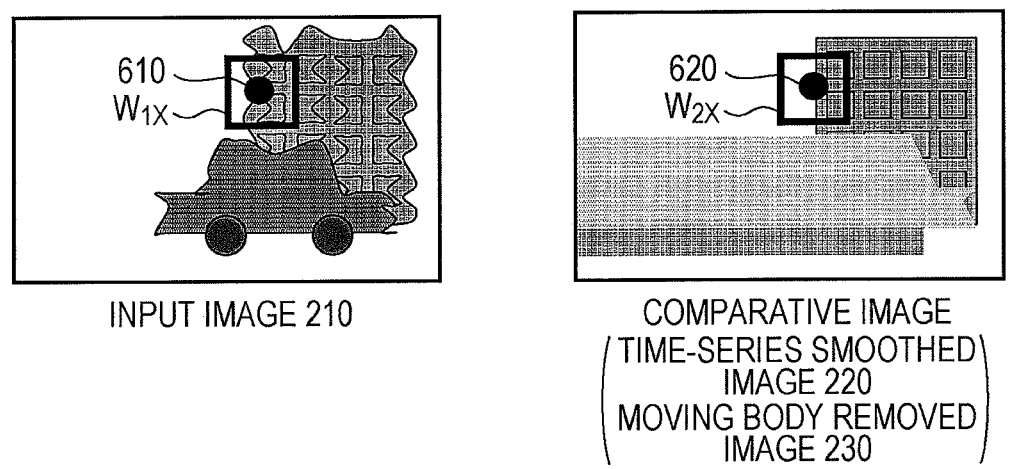
FIG. 7 is a conceptual diagram of a method of computing a separate evaluated cost according to the first embodiment.

FIG. 7 illustrates another example of a method of calculating an evaluated cost of each pixel by using a histogram difference $D_{W1,W2}$.

When windows $W_{1X}$, $W_{2X}$ are set such that the target pixel is a center, the histogram analyzing unit 130 computes the evaluated cost $C_x$ for the target pixel X, for example, as expressed by Formula (9).

[Mathematical formula 9]

$$C_X = D_{W_{1X}, W_{2X}} \quad \text{Formula (9)}$$

Figure 8:
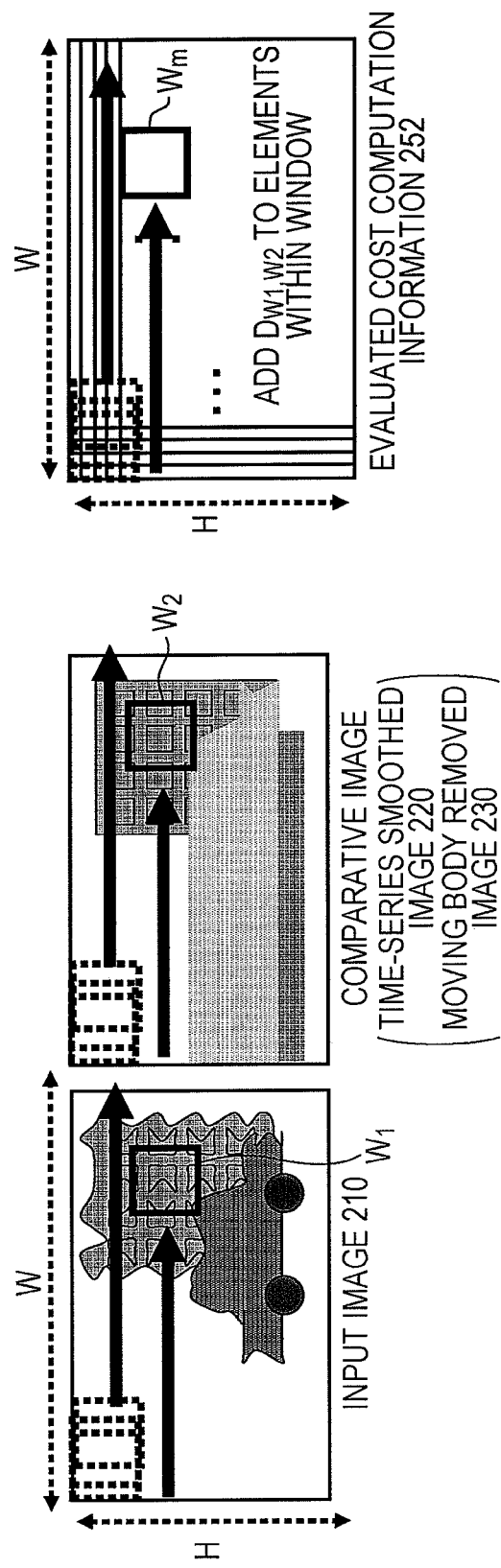
FIG. 8 is a conceptual diagram of calculation of an evaluated cost correspond to one frame according to the first embodiment.

FIG. 8 is an example of a method of computing an evaluated cost for one frame by Formula (8) in the histogram analyzing unit 130.

Further, the histogram analyzing unit 130 prepares cost computation information 252 that stores similarity information between images and initializes the cost computation information 252 to 0.

The cost computation information 252 is recorded in the computation memory 115, in which a frame (recording region) having the number of pixels which is horizontal W pixels×vertical H pixels similarly to the input image 210 is secured by the number of comparative image+1 or more. The reason of being one greater than the number of comparative images is for recording the mask information $M_{SR}$. In the present embodiment, the cost computation information 252 is data of three frames corresponding to the evaluated cost $C_S$ (i, j), the evaluated cost $C_R$ (i, j), and the mask information $M_{SR}$ (i, j). Further, $C_S$ (i, j) represents a value of the evaluated cost $C_S$ at a pixel (i, j), which is similarly applied to other pixels. Also, (i, j) represents X-axis and Y-axis coordinates of a relevant pixel, where i=0, 1, 2, . . . , W−1, and j=0, 1, 2, . . . , H−1.

Thereafter, the histogram analyzing unit 130 moves the window W1 on the input image 210, the window W2 on the comparative image, and the window Wm of a frame for the comparative image of the cost computation information 252, while shifting the windows W1, W2, and Wm by Δx in the direction of X axis (horizontal) and by Δy in the direction of Y axis (vertical) once at a time. Hereinafter, left and right coordinates of each frame is set to (X axis, Y axis)=(0, 0) and a coordinate system, in which an X coordinate and an Y coordinate increase in right and down directions, is used.

Specifically, the histogram analyzing unit 130 computes a histogram difference $D_{W1,W2}$ between the windows W1 and W2 for each movement, and adds the histogram difference to respective elements of the window Wm. In this case, the histogram analyzing unit 130 can perform processing by using Δx=1 and Δy=1. In the case in which the windows W1, W2 and Wm have been moved to the lower-right stage in each frame, the respective elements held in the frame of the cost computation information 252 finally become the evaluated costs $C_S$ and $C_R$.

Further, the histogram analyzing unit 130 may perform processing, such as a process of adding lower, left, and right ends as they are or a process of normalizing and adding the lower, left, and right ends.

Also, the histogram analyzing unit 130 can reduce the processing amount to improve an operation speed by increasing values of Δx and Δy. In this case, the evaluated cost becomes the same value within a block region of Δx×Δy. Therefore, it is preferable to suppress block distortion in edge portions of a divided region by using a filter or the like, which is described below.

Figure 9:
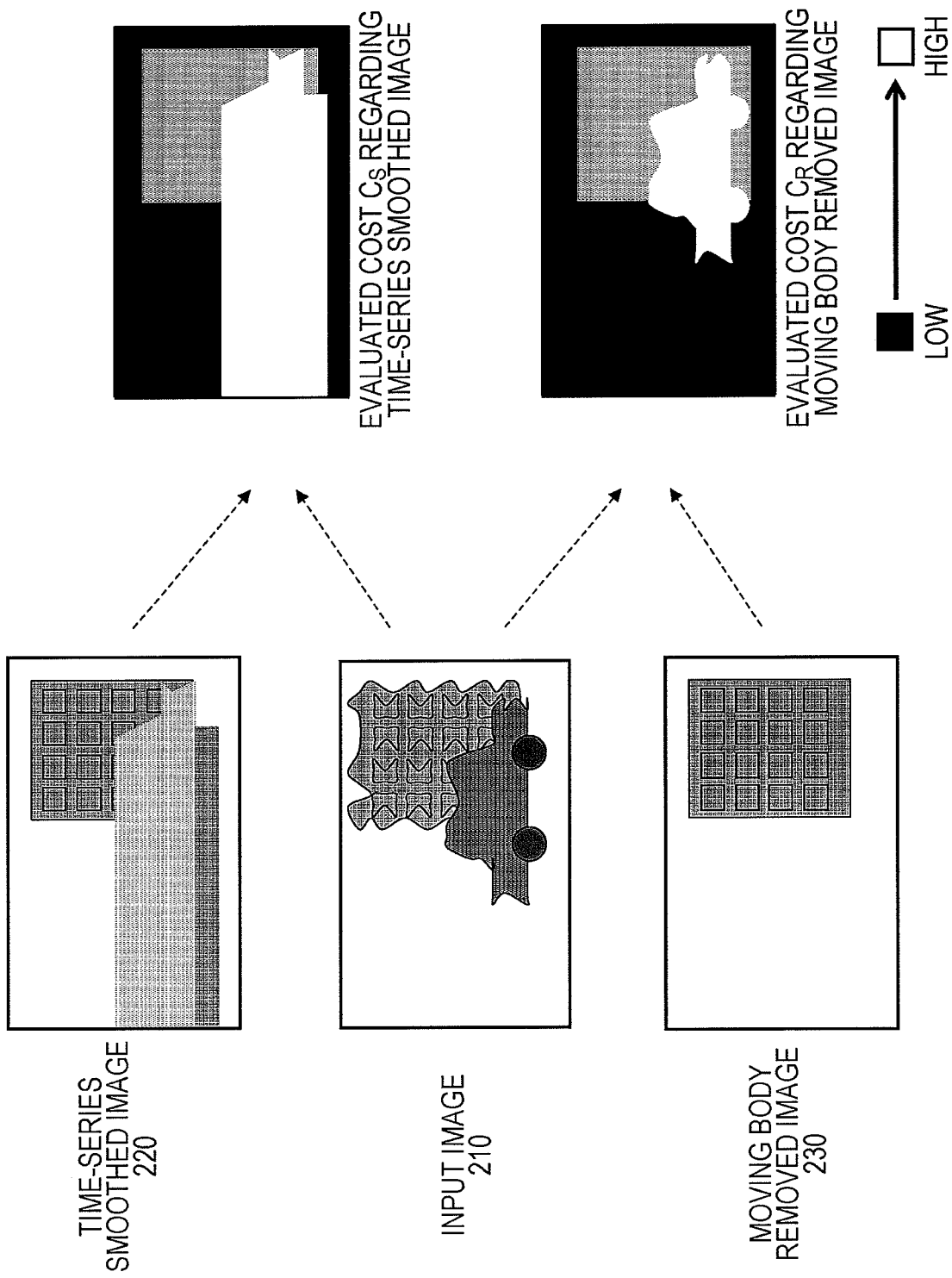
FIG. 9 is a conceptual diagram illustrating an example of an evaluated cost computed in the first embodiment.

FIG. 9 schematically illustrates characteristics of respective evaluated costs generated in step S102.

The evaluated cost $C_S$ indicates an evaluated cost that is computed for the input image 210 and the time-series smoothed image 220 which is set to the comparative image. The evaluated cost $C_S$ has characteristics that the evaluated cost increases for the moving body region of the time-series smoothed image 220, and in addition, a region through which the moving body has passed.

The evaluated cost $C_R$ indicates an evaluated cost that is computed for the input image 210 and the moving body removed image 230 which is set to the comparative image. The evaluated cost $C_R$ has characteristics that the evaluated cost increases only in the moving body region.

As described above, according to the present embodiment, the histogram differences are respectively computed and compared with each other, with respect to a combination of the input image 210 and the time-series smoothed image 220 or a combination of the input image 210 and the moving body removed image 230.

Note that the inter-image similarity evaluating process may be performed according to various technologies, as long as the similarity between images is evaluated by using the histogram difference and the evaluated cost is output.

First, although evaluated costs are calculated equally for respective pixels within an image in the present embodiment, the embodiment is not limited thereto. For example, the histogram analyzing unit 130 may perform computation in a region unit, which are significantly combined, by referring to a result of previous region classification or designation of a user.

Also, the histogram analyzing unit 130 may perform comparison and calculates an evaluated cost with respect to a combination different the above-described combination, for example, in such a way to set one frame of the input image group 200 as a target image and compare the target image with a separate image temporally closed thereto.

Further, the histogram analyzing unit 130 may perform histogram analysis on image data having any format. For example, when the image data is expressed by primary colors R, G and B in a color space, it is preferable to compute histogram differences for respective components, add up them and set a result of the addition to the evaluated cost.

Although the histogram analyzing unit 130 performs histogram generation in a window unit which is expressed in an image block in which there is spatial continuity, the embodiment is not limited thereto. For example, the histogram analyzing unit 130 may perform processing of integrating a plurality of regions which are spatially separated from each other, and generating and comparing histograms with each other.

Returning to FIG. 2, in step S103, the region dividing unit 140 performs a region dividing process.

Specifically, the region dividing unit 140 divides an image into three regions by classifying each image into the categories of the "moving body region", the "background region" or "the quasi moving body region", based on the evaluated costs computed by the histogram analyzing unit 130.

Figure 10:
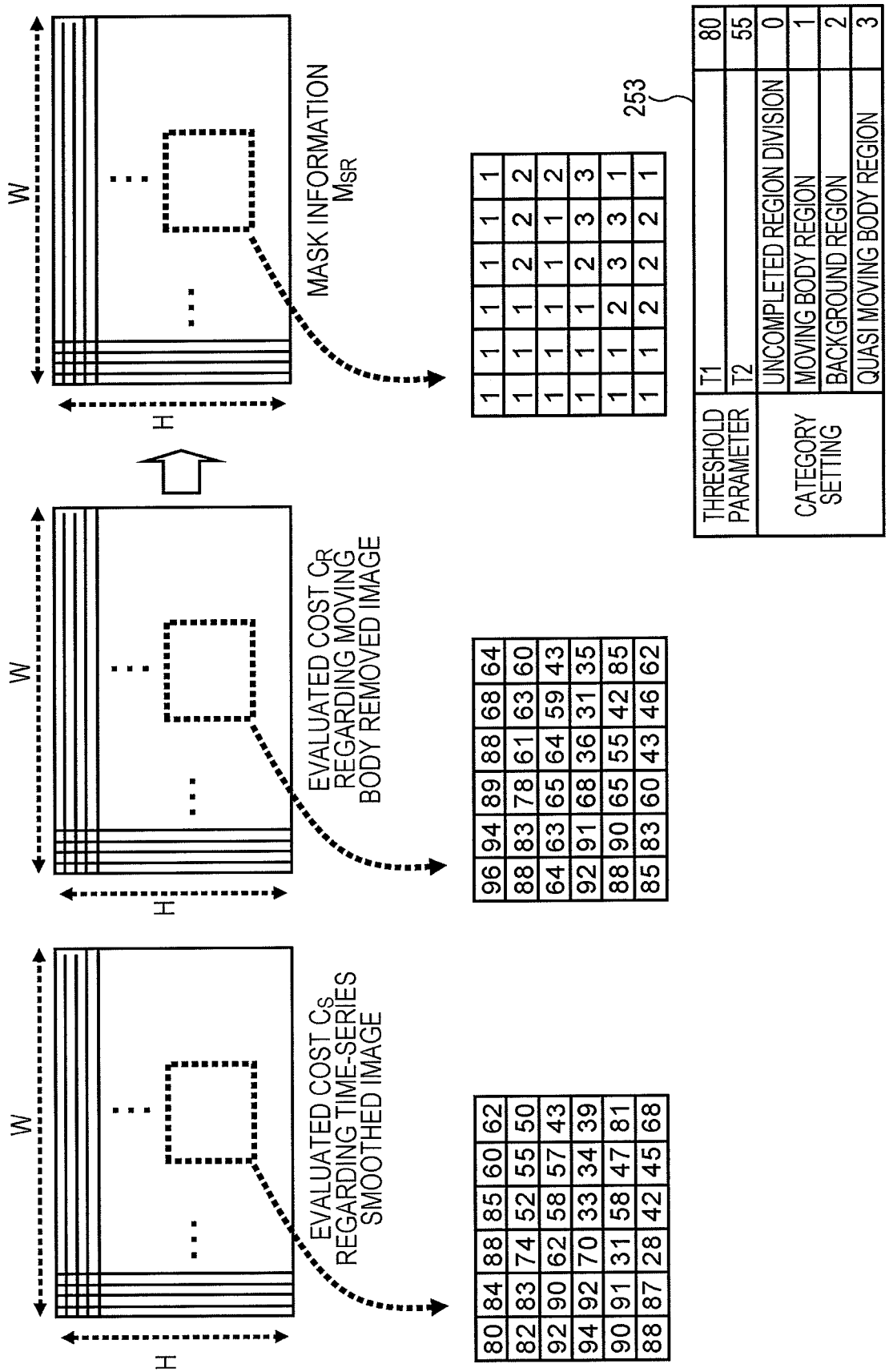
FIG. 10 is a conceptual diagram illustrating overview of a region dividing process according to the first embodiment.

FIG. 10 illustrates examples of the evaluated costs $C_S$ and $C_R$ included in the cost computation information 252, content of the mask information $M_{SR}$, and content of mask setting 253.

$C_S$, $C_R$ and $M_{SR}$ are held by a quantity corresponding to one frame and a practical value which is held is represented in a matrix form, with respect to any one portion (6×6 pixels).

The region dividing unit 140 records the mask information $M_{SR}$ indicating to which category each pixel belongs in the cost computation information 252 of the computation memory 115 by using the evaluated cost $C_S$ and the evaluated cost $C_R$ calculated by the histogram analyzing unit 130.

The region dividing unit 140 determines a category to which each pixel belongs by respectively comparing the evaluated costs $C_S$ and $C_R$ with a threshold parameter T of the mask setting 253 and writes the mask information $M_{SR}$ according to the category setting of the mask setting 253. That is, in the case of $C_S(i, j)>T$ and $C_R(i, j)>T$, a pixel (i, j) is determined to be the moving body region. In other cases, when $C_S(i, j)<C_R(i, j)$, the pixel (i, j) is determined to be the background region, and otherwise, the pixel (i, j) is determined to be the quasi moving body region.

Further, one of illustrated two threshold values T1 and T2 is assumed to correspond to T. In practice, after the threshold T has been set to a predetermined initial value, the parameter optimizing unit 180 adjusts the threshold T at periods of one frame by a parameter optimizing process which will be described below. Also, the category setting of the mask setting 253 is made such that "uncompleted region division"=0, "moving body region"=1, "background region"=2 and "quasi moving body region"=3 as illustrated in FIG. 10.

(Example of Recursive Calculation of Mask Information $M_{SR}$)

The region dividing unit 140 can use various methods in order to calculate the mask information $M_{SR}$ from the two types of evaluated costs $C_S$ and $C_R$.

Figure 11:
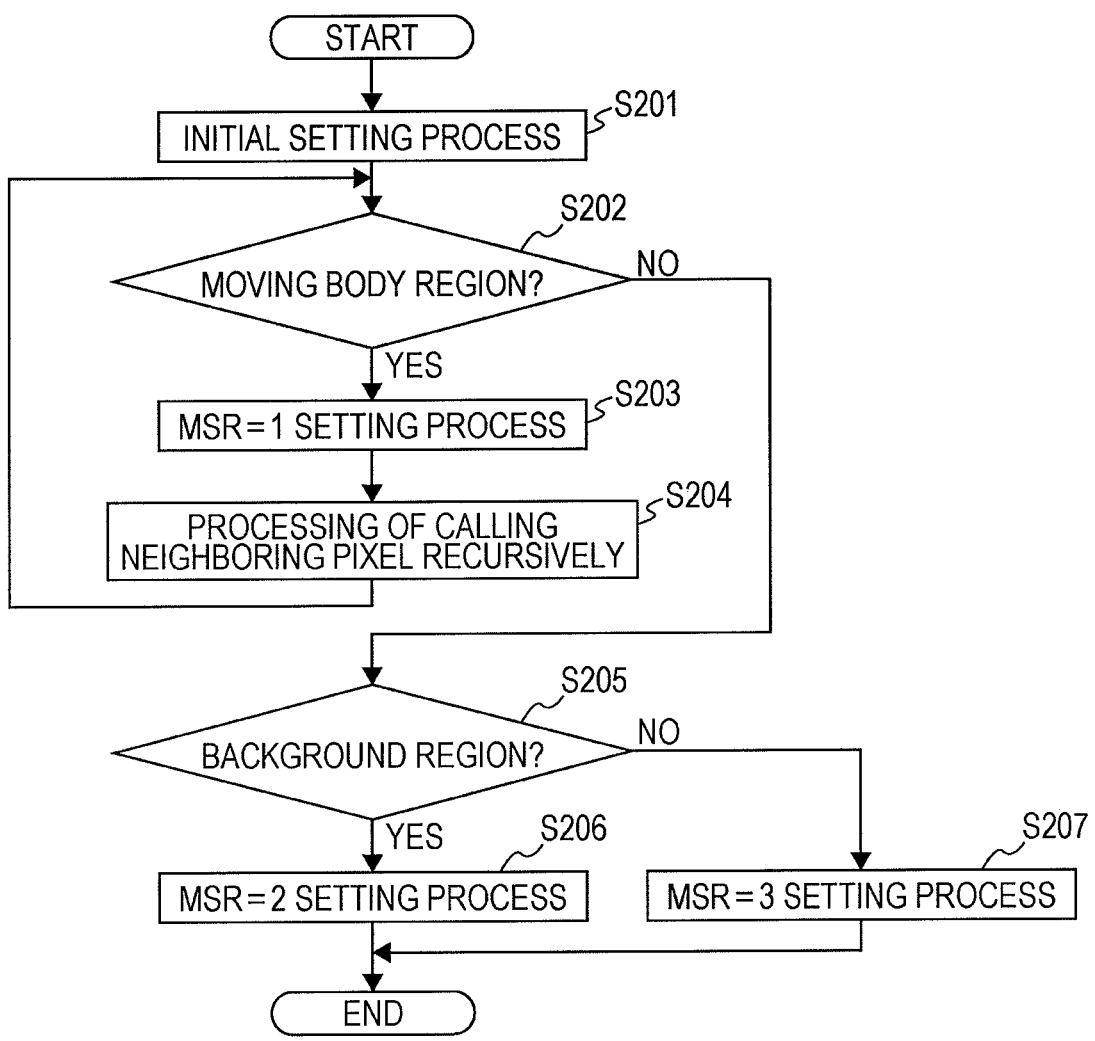
FIG. 11 is a flowchart of a recursive computing process of mask information $M_{SR}$ in the region dividing process.

FIG. 11 illustrates a recursive algorithm of appropriately computing the mask information $M_{SR}$ from the evaluated costs $C_S$ and $C_R$ by adaptively using a plurality of thresholds.

The algorithm enables robust region division considering spatial continuity of a subject region by performing evaluation using the two thresholds T1 and T2 (T1>T2) in such a way to use the low threshold T2 for a pixel adjacent to the moving body, and otherwise, use the high threshold T1.

First, in step S201, the region dividing unit 140 performs an initial setting process.

In the process, the region dividing unit 140 selects a pixel (i, j) on which the process is uncompleted as a target pixel, and initializes the target pixel (x, y)=(i, j) to a variable Tc=T1 according to a threshold.

Next, in step S202, the region dividing unit 140 determines whether the target pixel is the moving body region by using T1 as a threshold. Specifically, the region dividing unit 140 performs determination of Yes when $C_S$(x, y)>Tc or $C_R$(x, y)>Tc. In other cases, determination of No is made.

In the case of Yes, the region dividing unit 140 determines that the target pixel is the moving body region, and allows the process to proceed to step S203.

In the case of No, the region dividing unit 140 allows the process to proceed to step S205.

In step S203, since (x, y) is the moving body region, the region dividing unit 140 performs a process of setting up $M_{SR}$(x, y)=1 and thereafter, allows the process to proceed to step S204.

Next, in step S204, the region dividing unit 140 performs a neighboring pixel recursive-calling process. Specifically, after setting of a variable Tc=T2, the region dividing unit 140 recursively calls the process of step S202 for a pixel on which the process is uncompleted from among pixels (x, y)=(I−1, j), (i, j−1), (I+1, j), and (i, j+1) adjacent to the target pixel on left, upper, right, and lower sides, and completes the region dividing process.

In step S205, when the target pixel is not the moving body region, the region dividing unit 140 determines whether the target pixel is the background region. Specifically, the region dividing unit 140 performs determination of Yes when $C_S$(x, y)<$C_R$(x, y). In other cases, determination of No is made.

In the case of Yes, the region dividing unit 140 allows the process to proceed to step S206.

In the case of No, the region dividing unit 140 allows the process to proceed to step S207.

In step S206, the region dividing unit 140 determines that the target pixel is the background region, performs a process of setting up $M_{SR}$(x, y)=2, and completes the region dividing process with respect to the target pixel (x, y).

In step S207, the region dividing unit 140 determines that the target pixel is the quasi moving body region, performs a process of setting up $M_{SR}$(x, y)=3, and completes the region dividing process with respect to the target pixel (x, y).

The above-described recursive calling is calling of one function (procedure) summarizing steps S202 to S207 within the function. In the present example, once the target pixel (x, y) comes into contact with the moving body region, the moving body region is preferentially swiped by recursive calling and edges of the moving body region are caused to be easily included in the moving body region by applying the small threshold T2.

When deformation due to heat haze is great to a certain level even in a region which should be included in a background in the case of using a single threshold T, the evaluated cost is not lowered to a low value, a portion of the background is identified as being the moving body, and there is possibility that image quality is deteriorated. When the threshold is rather increased, and a region which should be included in the moving body has a color closed to a background color, the evaluated cost due to histogram analysis is caused not to have a very high value, thereby leading to a critical problem that the region is determined to be a background and disappears in the output image. Also, since the influence of deformation due to heat haze is worked and the evaluated cost is dispersed in the contour portion of the moving body, it is easy to erroneously identify the background as the moving body or vice versa. Therefore, artifacts, such as loss of a portion (contour) of the moving body, are main factors of subjective degradation in image quality.

In this regard, an algorithm using two types of thresholds T1 and T2 can realize robust region division. The threshold may be changed. In an example, when respective pixel values are set to 8-bit gradations of 0 to 255, it is possible to use the threshold T1=80, and the threshold T2=55.

(Operation Example of Region Division by Mask Information $M_{SR}$)

Figure 12A:
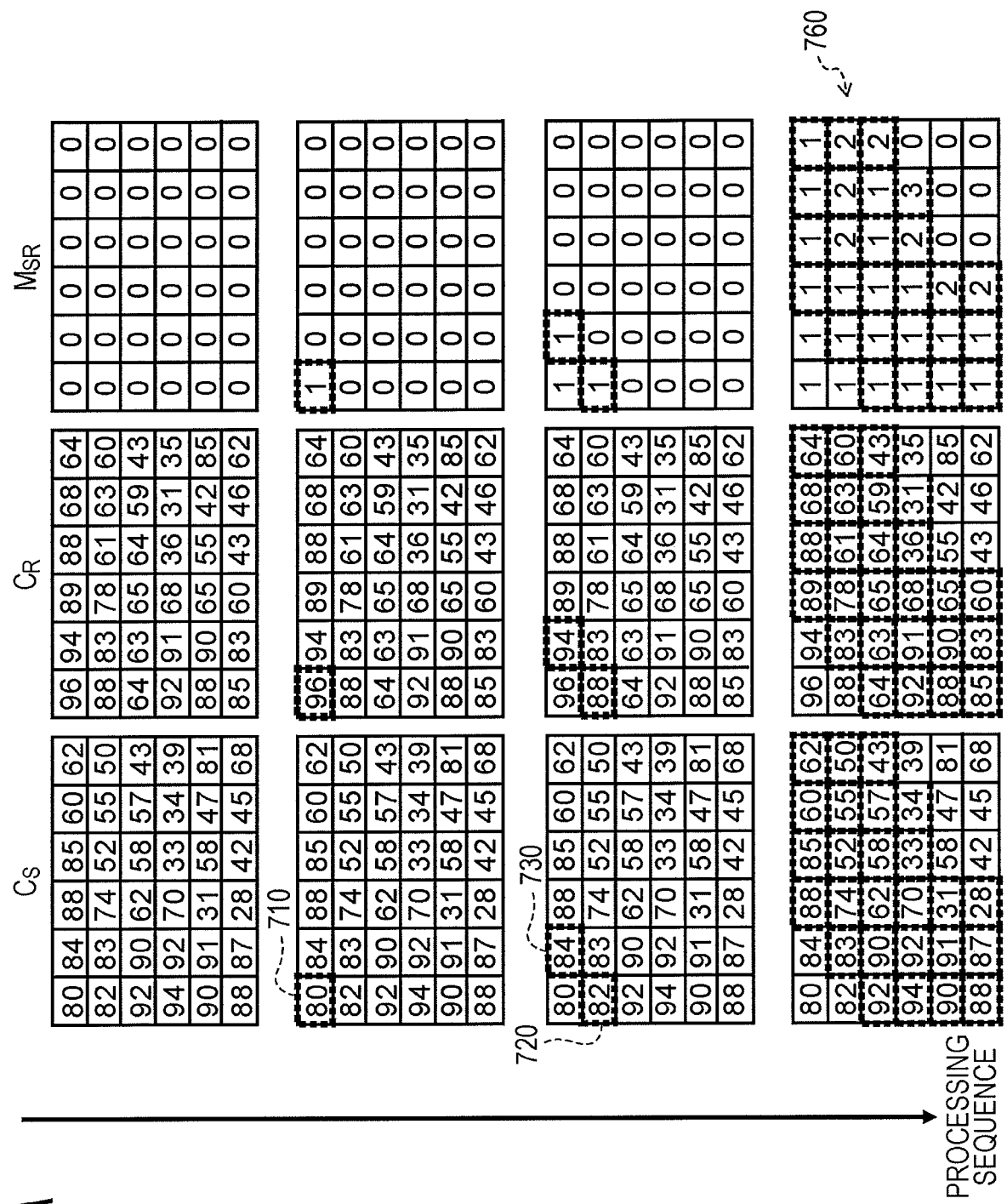
FIGS. 12A and 12B are conceptual diagrams illustrating an operation example of a region dividing process according to the first embodiment.
Figure 12B:
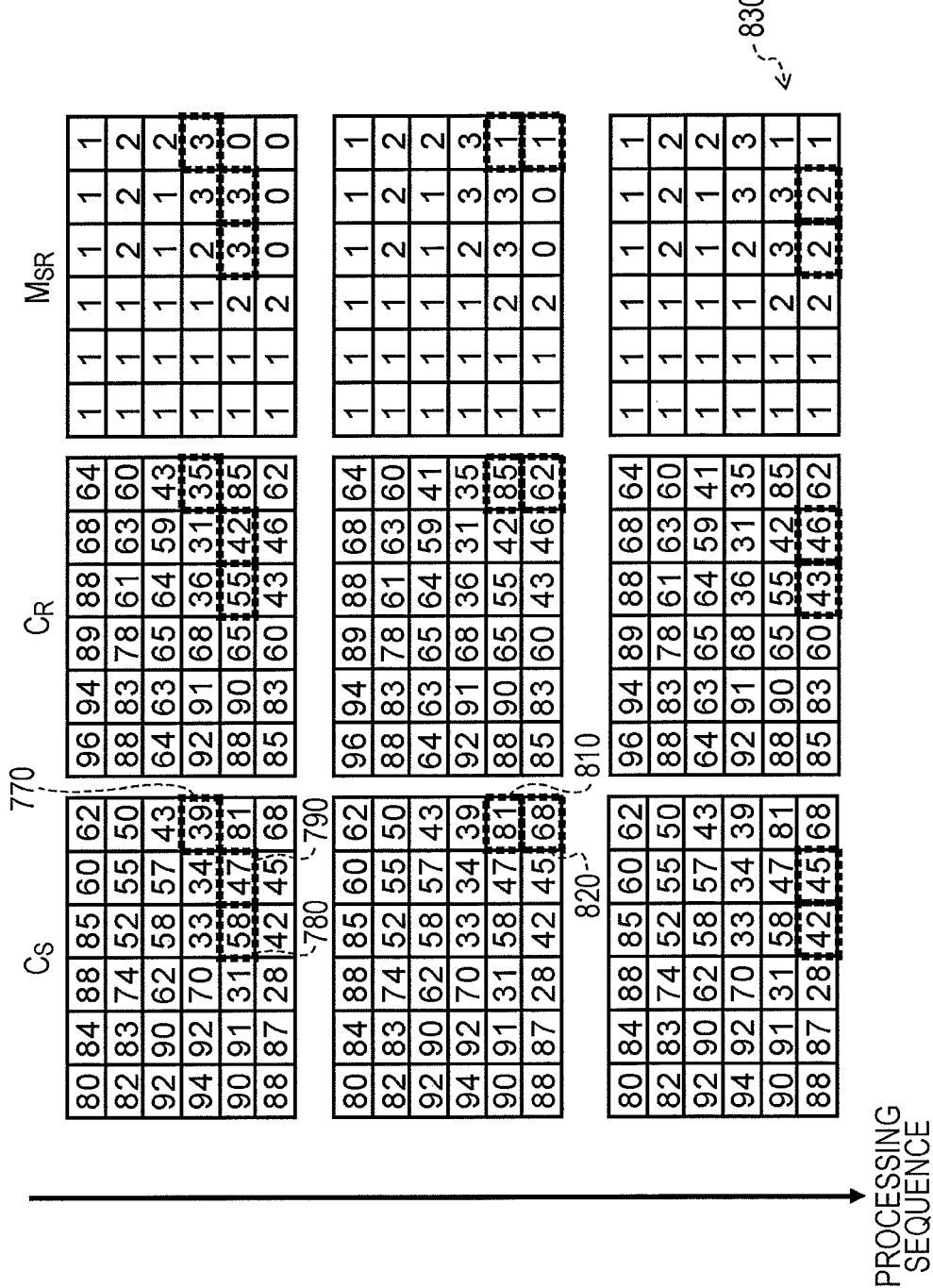

FIGS. 12A and 12B illustrate operation examples of region division by the above-described methods.

In each drawing, each of matrixes of $C_S$, $C_R$, and $M_{SR}$ is a portion at the same position of one frame held in the cost computation information 252 similarly as illustrated in FIG. 10 and, there are illustrated cases in which, as the processing proceeds, $M_{SR}$ is sequentially recorded.

In the top stage of FIG. 12A, an initial state is illustrated and $M_{SR}$ is all 0 (uncompleted). The region dividing unit 140 selects one pixel 710 from among pixels, for which the region division is uncompleted, as a target pixel and compares the evaluated costs $C_S$ and $C_R$ with a threshold T1. In this case, since the stored values of the both evaluated costs are greater than the threshold T1, it is determined that the target pixel is the moving body region and a value of the target pixel of the mask information $M_{SR}$ is set to 1. The second stage illustrates a state immediately after that.

In this case, since the target pixel is the moving body region, the region dividing unit 140 recursively performs evaluation using a threshold T2 on pixels 720 and 730, for which the region division is uncompleted, from among pixels adjacent to the target pixel 710 on left, upper, right, and lower sides and determines mask information. The region dividing unit 140 recursively performs the evaluation using the threshold T2 until a pixel other than the moving body region is found, and calculates a portion 760 of the mask information $M_{SR}$. The bottom stage illustrates a state immediately after that.

When the recursive processing is completed, the region dividing unit 140 restores the threshold to T1 again. When comparison and evaluation processing is performed for the pixel 770 for which processing is uncompleted, the region dividing unit 140 knows that the pixel is the quasi moving body region and sets a value for the target pixel of the mask information $M_{SR}$ to 3. The top stage of FIG. 12B illustrates a state immediately after that.

In this case, since the target pixel has not been the moving body region, the region dividing unit 140 does not perform recursive computation and continuously performs processing on the pixels 780 and 790 for which the processing is uncompleted. Then, since a pixel 810 is identified again as being the moving body region, the region dividing unit 140 sets the threshold to T2 and performs evaluation of a neighboring pixel 820. The central stage of FIG. 12B illustrates a state immediately after that. When such processing is continuously made, a portion 830 of the mask information $M_{SR}$ which does not include a pixel of 0 is obtained and the region division is achieved.

Although the present embodiment is described with respect to a method of recursively expanding the moving body region, a non-recursive operation may be performed to obtain the similar result in a case where it is difficult to perform recursive computation, such as a case of performing hardware implementation.

Figure 13:
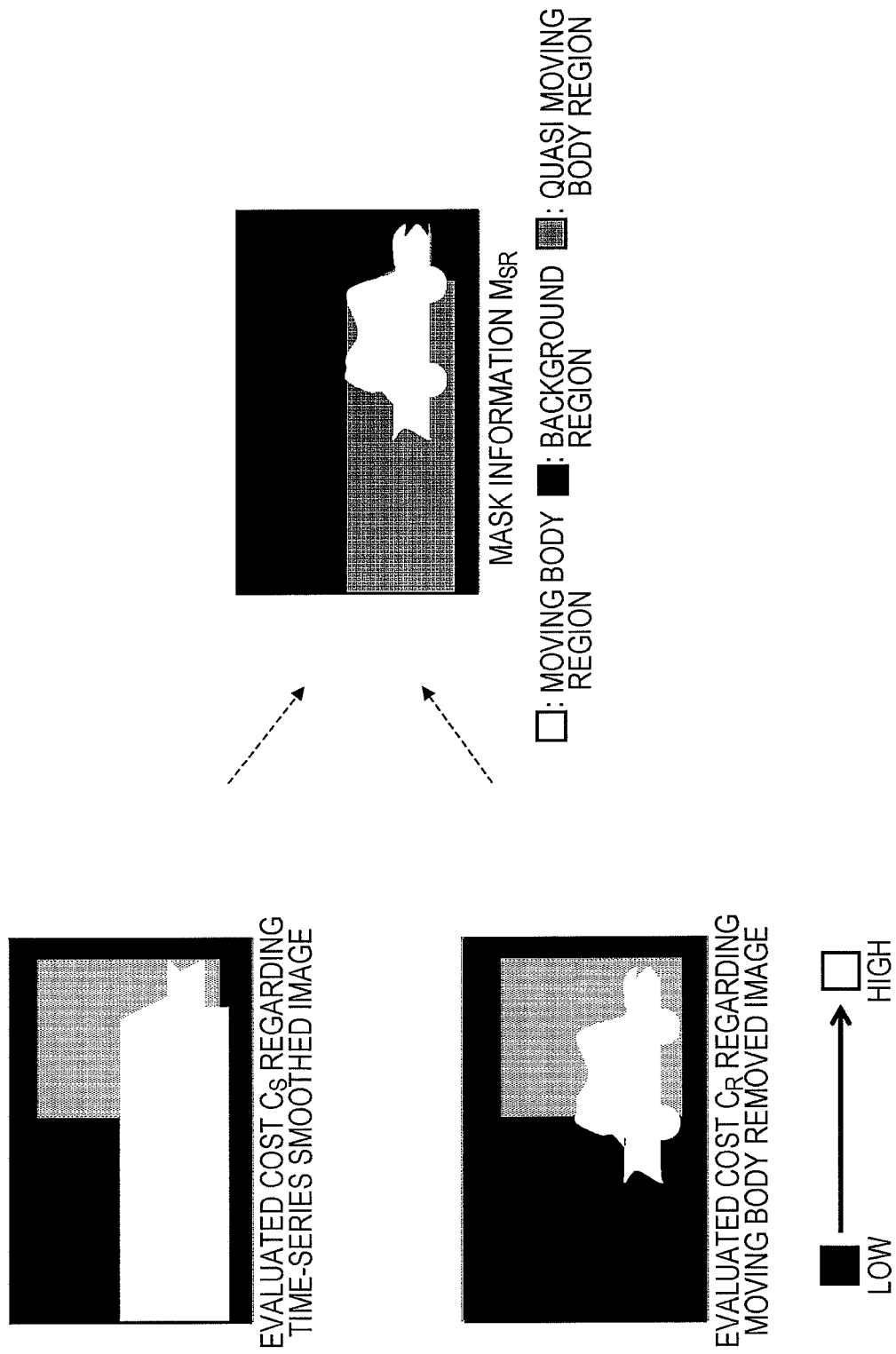
FIG. 13 is a conceptual diagram of mask information $M_{SR}$ computed by the region dividing process according to the first embodiment.

FIG. 13 visually illustrates an example of the mask information $M_{SR}$ computed by the above-described process.

That is, the above-described computation is performed by the evaluated cost $C_S$ calculated by using the time-series smoothed image 220 and the input image 210 and the evaluated cost $C_R$ calculated by using the moving body removed image 230 and the input image 210 and the mask information $M_{SR}$ that is a result of the region division into three types of categories.

Also, although the region division into three types of categories is performed by using the two types of evaluated costs $C_S$ and $C_R$ in the present embodiment, it is possible to arbitrarily set the type of evaluated cost or the number of categories.

For example, the region dividing unit 140 may perform division into two types of categories including the moving body region and the background region by using only the evaluated cost $C_S$ related with the time-series smoothed image 220.

The region dividing unit 140 may perform division into two types of categories by using only the evaluated cost $C_R$ regarding the moving body removed image 230. In this case, when an entire screen is detected as a moving body due to factors, such as camera movement or a change in scene once, the moving body removed image is not updated any more since then. Therefore, the region dividing unit 140 can suppress a computation amount and secure region division in such a way to separately detect a change in scene or camera movement itself or set a timer and reset calculation of the evaluated cost $C_R$ at predetermined time periods.

In addition, the region dividing unit 140 may perform division into four types of categories, such as sets the quasi moving body region with a plurality of levels, by using a separate comparative image.

Next, in step S104, the image correcting unit 150 performs an image correcting process.

The image correcting process according to the present embodiment will be described in detail below with reference to FIGS. 14 to 16.

The image correcting unit 150 performs heat haze correction by using the mask information $M_{SR}$ input from the region dividing unit 140, the input image 210, the time-series smoothed image 220, and the moving body removed image 230, and outputs the corrected image 254.

Thereafter, the image correcting unit 150 executes a spatial-direction image filter for the input image 210 and outputs the corrected image 256 which is so natural that the region division is not noticeable.

First, a concept of the image correcting process according to the present embodiment will be described with reference to FIG. 14.

In this process, the image correcting unit 150 performs heat haze correction by performing different processes depending to a category type indicated in the mask information $M_{SR}$. In the present embodiment, the image correcting unit 150 generates the corrected image 254 by selecting three types of images according to categories and performing image synthesis.

That is, the image correcting unit 150 selects a value of a pixel group 1010 which is placed at the same coordinates on the input image 210, for a pixel identified as the moving body region, as in a pixel group 1110 of the mask information $M_{SR}$.

Further, the image correcting unit 150 selects a value of a pixel group 1020 which is placed at the same coordinates on the time-series smoothed image 220, for a pixel identified as the background region, as in a pixel group 1120 of the mask information $M_{SR}$.

Similarly, the image correcting unit 150 selects a value of a pixel group 1030 which is placed at the same coordinates on the moving body removed image 230, for a pixel identified as the quasi moving body region, as in a pixel group 1130 of the mask information $M_{SR}$.

In this way, the image correcting unit 150 generates the corrected image 254 in which distortion due to heat haze is corrected in a region other than the moving body.

In this case, the image correcting unit 150 generates the corrected image 256 from the corrected image 254 by using the adaptive filter 152. Generally, deformation of a body due to heat haze is observed to be strong at an edge portion and a detailed portion of texture of the body. Also, since the edges of the moving body correspond to joints between other images in the corrected image 254, unnatural edges appear. Therefore, it is preferable that the image correcting unit 150 selectively executes a smoothing filter which is robust to the edge portion and the texture.

Figure 15:
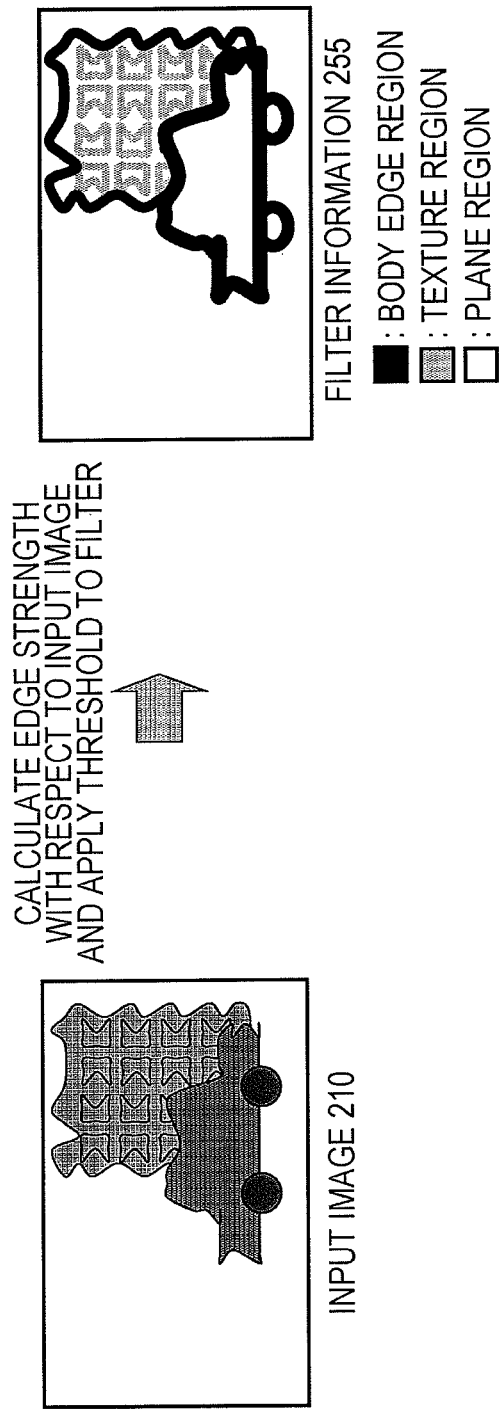
FIG. 15 is a conceptual diagram of classification of filter types in the image correcting process according to the first embodiment.

FIG. 15 illustrates an example in which the adaptive filter 152 selectively executes a smoothing filter.

The adaptive filter 152 included in the image correcting unit 150 calculates a change in tones at the edges of the input image 210 or the corrected image 254 by using a Sobel filter due to primarily differentiation, a Prewitt filter, or the like, and calculates sharpness (edge strength) of a change in tones of the edges. In addition, the image correcting unit 150 can calculate a value obtained by subtracting the minimum value from the maximum value of pixel values placed around 5×5 pixels of the target pixel, for example, as an edge strength.

After calculation of the edge strength, the adaptive filter 152 classifies the input image 210 or the like into three regions including a "body edge region", a "texture region" and a "plane region" by using thresholds $T_A$ and $T_B$ ($T_A > T_B$) which are two types of predetermined values, and temporarily holds a result thereof as filter information 255.

Specifically, the adaptive filter 152 classifies a pixel of which the edge strength is equal to or greater than the threshold $T_A$ into the body edge region.

Also, the adaptive filter 152 classifies a pixel of which the edge strength is equal to or greater than the threshold $T_B$ and less than the threshold $T_A$ into the texture region.

Also, the adaptive filter 152 classifies a pixel of which the edge strength is less than the threshold $T_B$ into the plane region.

Expansion processing that is one type of a morphology operation is appropriately performed on the body edge region.

The adaptive filter 152 of the image correcting unit 150 applies a different spatial filter to the corrected image 254 according to a region type indicated by the filter information 255. It is preferable that the adaptive filter 152 applies an edge smoothing filter 152c for smoothing edges to the body edge region, a bilateral filter 152t for smoothing edges while preserving the edges to the texture region, and a Gaussian filter 152*f* in which a gradation intensity is not strong to the plane region. Therefore, smoothing is selectively performed on portions in which deformation due to heat haze is easily noticeable.

Also, the adaptive filter 152 can not only compute the edge strength, but also compute a value of dispersion (dispersion in a spatial domain) of a pixel value in the vicinity of the target pixel upon classification into the above-described filter types. For example, the adaptive filter 152 introduces a new threshold $T_E$ and performs determination as described below, thereby achieving more precise processing. That is, the adaptive filter 152 can determine the body edge region when the edge strength is equal to or greater than the threshold $T_A$, determines the texture region when the edge strength is equal to or greater than the threshold $T_B$ and less than the threshold $T_A$, or when the dispersed value is equal to or greater than the threshold $T_E$, and determine the plane region in other cases.

FIG. 16 illustrates an example of the edge smoothing filter 152*c* that is applied to the body edge region, which is the above-described filter type. The edge smoothing filter 152*c* is a filter that smoothes edges by greatly thinning out pixels once and interpolating remaining pixels, for example, with respect to an edge portion of an image.

It is preferable to use, for example, a spline curve as a method of interpolating pixels. In this case, a smoothed curve is obtained without substantially thinning out pixels.

As a more simple method, the edge smoothing filter 152*c* may perform processing to greatly reduce an image once, expand the image emphasize edge portions, and subsequently perform sharpness processing so as to emphasize dull edge portions.

Further, the adaptive filter 152 may apply another filter to the respective regions (filter types) or may not need to apply a filter to regions other than the body edge region. Further, the adaptive filter 152 may be omitted, and the image correcting unit 150 may perform only image synthesis.

Further, the image correcting unit 150 calls the adaptive filter 152 while performing synthesis of the corrected image 254 pixel by pixel, to apply the edge smoothing filter 152*c* or the like to the input image 210 which is a source, the time-series smoothed image 220, or the moving body removed image 230.

Further, generation of the filter information 255 is not limited to a configuration that again computes the edge strength or distribution and classifies region types and the filter information 255 may be derivatively obtained during computation of the mask information $M_{SR}$ or a heat-haze distortion level DL which is described below. For example, it is possible to handle, for example, a pixel of $M_{SR}=2$ and a neighboring pixel of $M_{SR}=1$ as a body edge.

Further, the image correcting unit 150 may call and perform the super-resolution process of step S108 described below with respect to respective pixels of the "background region" and the "quasi moving body region" in the course of calculating the corrected image 254 or the corrected image 256.

Next, in step S105, the moving body removed image updating unit 160 performs a moving body removed image updating process.

Specifically, the moving body removed image updating unit 160 updates the moving body removed image 230 stored in the moving body removed image memory 113, outside a moving region, by using the mask image $M_{SR}$ input from the region dividing unit 140 and the input image 210.

The moving body removed image updating unit 160 calculates the moving body removed image 230 by using an updating formula by a moving average expressed in, for example, the following Formula (10).

[Mathematical Formula 10]

$$b(i,j)=t \times b(i,j)+(1-t) \times p(i,j) \text{ <however, in the case of } M_{SR}(i,j) \neq 1> \quad \text{Formula (10)}$$

In Formula (10), b(i, j) denotes a pixel value at coordinates (i, j) on the moving body removed image, $M_{SR}$(i, j) denotes a value of the mask information $M_{SR}$ regarding a pixel at coordinates (i, j), and t denotes an update parameter (0<t<1).

In this case, the moving body removed image 230 at an initial value of b(i, j), that is, of the first frame, can use the input image 210 itself as expressed in, for example, Formula (11).

[Mathematical Formula 11]

$$b(i,j)=p(i,j) \quad \text{Formula (11)}$$

Further, the moving body removed image updating unit 160 may set a value which is disposed at a center from among pixel values at the same coordinates of a plurality of frames, as a pixel value at the coordinates on the moving body removed image 230, without performing the above-described averaging process.

Further, the moving body removed image updating unit 160 is not limited thereto, and may calculate a pixel value by using another method.

Next, in step S106, the heat haze distortion computing unit 170 performs a distortion level outputting process.

Figure 17:
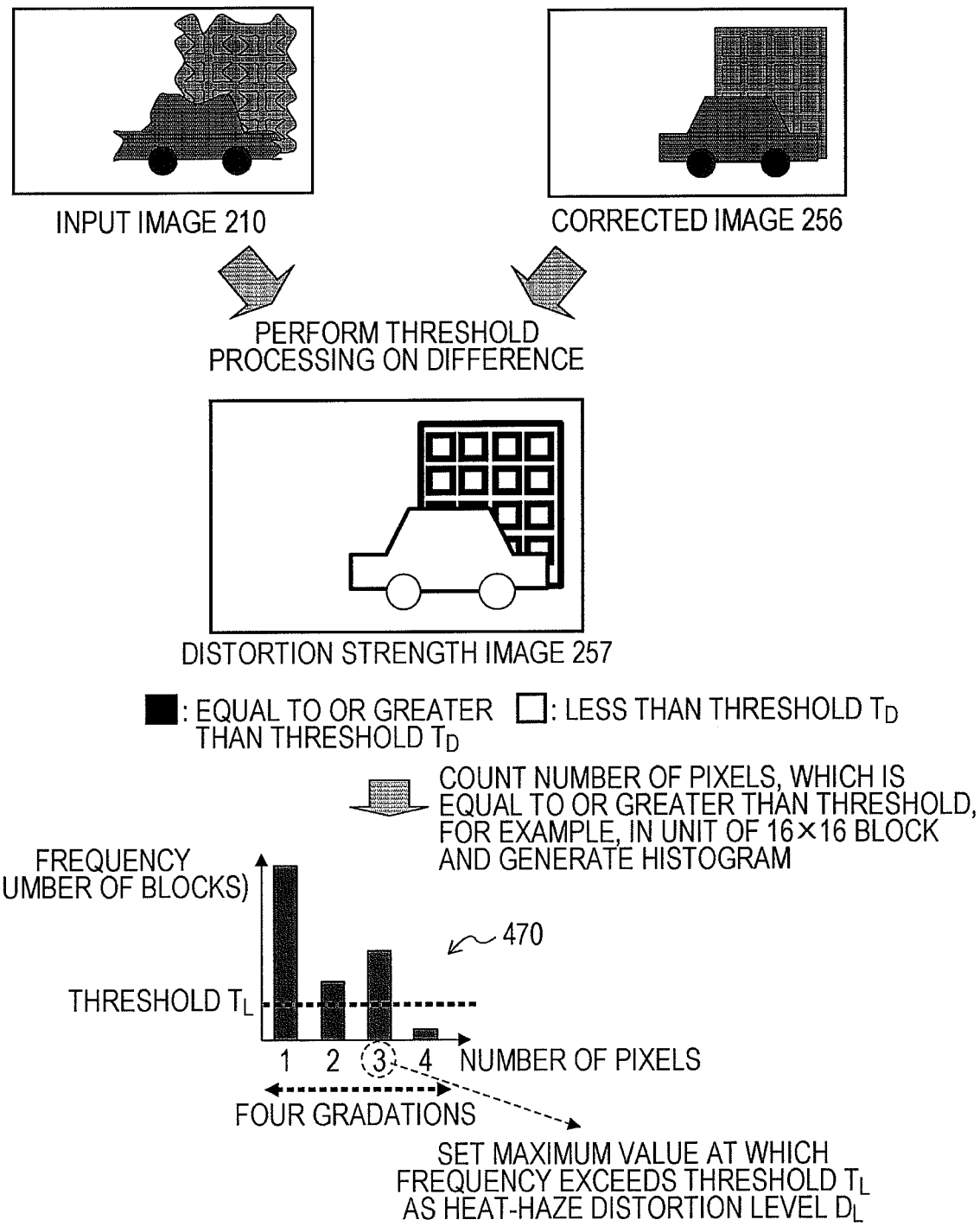
FIG. 17 is a conceptual diagram of a distortion level outputting process according to the first embodiment.

Referring to FIG. 17, the heat haze distortion computing unit 170 computes an image distortion amount due to heat haze by using the input image 210, the mask information $M_{SR}$ input from the region dividing unit 140 and the corrected image 256 input from the image correcting unit 150 (or the output image 240), and outputs the distortion level thereof.

In this case, the heat haze distortion computing unit 170 calculates the image distortion amount due to heat haze as the distortion strength image 257 based on a difference between the input image 210 and the corrected image 256.

FIG. 17 illustrates an example of a method of computing an image distortion amount.

First, the heat haze distortion computing unit 170 computes an absolute value of the difference for each pixel between the input image 210 and the corrected image 256, determines whether the absolute value is equal to or greater than/less than a predetermined threshold $T_D$, and performs binarization. Thus, the heat haze distortion computing unit 170 can obtain the distortion strength image 257 indicting (two values) whether distortion due to heat haze occurs for each pixel.

The heat haze distortion computing unit 170 determines that a pixel at which the difference is equal to or greater than the threshold has distortion due to heat haze, and determines that a pixel at which the difference is less than the threshold does not have distortion due to heat haze.

Subsequently, the heat haze distortion computing unit 170 divides the distortion strength image 257 into blocks having a size of N×N (for example, N=16), which do not overlap each other. The heat haze distortion computing unit 170 counts the number of pixels at each of which distortion does not occur from among the respective blocks, and generates a histogram.

For example, in the example of FIG. 17, the heat haze distortion computing unit 170 quantizes the number of pixels at which distortion occurs with a predetermined value, such as four gradations, and generates a histogram 470. The horizontal axis of the histogram 470 represents the number of pixels at which distortion occurs and the vertical axis represents the number of clocks (frequency). The heat haze distortion computing unit 170 determines the maximum number of pixels as a heat haze distortion level $D_L$ at which the frequency exceeds a threshold $T_L$ from among the numbers of pixels which are gradated into four gradations, by using the predetermined threshold $T_L$ which is appropriately set.

In the example of FIG. 17, since a frequency at value 3 exceeds the threshold and a frequency at value 4 does not exceed the threshold $T_L$ in the histogram, the heat haze distortion level $D_L$ is determined to be 3.

Further, the heat haze distortion computing unit 170 may perform processing, such as select data to be transmitted to another application, or perform weight computation based on whether distortion occurs at a target pixel by referring to the distortion strength image 257.

That is, the heat haze distortion computing unit 170 may transmit block positions of pixels at which distortion due to a heat haze does not exist and reliability is high to an application which handles statistical information of pixel values of a screen, for example, focal distance computation of a digital camera or correction of image gradations.

In this way, another application can perform or omit various types of processes based on the distortion strength image 257 which is information indicating whether distortion occurs in a certain place within a screen, thereby increasing processing accuracy of the application.

Next, in step S107, the parameter optimizing unit 180 performs a parameter optimizing process.

Specifically, the parameter optimizing unit 180 controls and optimizes various types of parameters for region division and image updating, based on the heat haze distortion level $D_L$ input from the heat haze distortion computing unit 170. For example, update parameters s and t for updating the time-series smoothed image 220 or the moving body removed image 230 can be easily changed. Since, as the update parameters s and t are set to a larger value, the strength of smoothing increases, strong distortion can be corrected, but resolution is reduced. Therefore, the parameter optimizing unit 180 may perform control such that, as the heat haze distortion level DL increases, values of the update parameters s and t increase.

Further, the parameter optimizing unit 180 may perform control such that, as the distortion level increases, the thresholds T1 and T2 increase, with respect to the thresholds T1 and T2 that are threshold parameters set as parameters for region division, thereby keeping accuracy of region division high.

Besides, the sizes Δx and Δy of the windows 610 and 620 may be controlled in the inter-image similarity evaluating process S102.

Further, the parameter optimizing unit 180 not only performs parameter optimization based on the heat haze distortion level $D_L$ computed in an entire screen but also performs parameter optimization by directly using the distortion strength image 257. That is, the parameter optimizing unit 180 can change a parameter according to a place even in one screen by using the distortion strength image 257 indicating at which place in the screen distortion occurs, thereby achieving a finer optimization.

For example, the parameter optimizing unit 180 may set the parameters s, t, T1 and T2 to be large in the region of a filter type in which distortion occurs and set the parameters s, t, T1 and T2 to be small in regions in which distortion does not occur.

Figure 2:
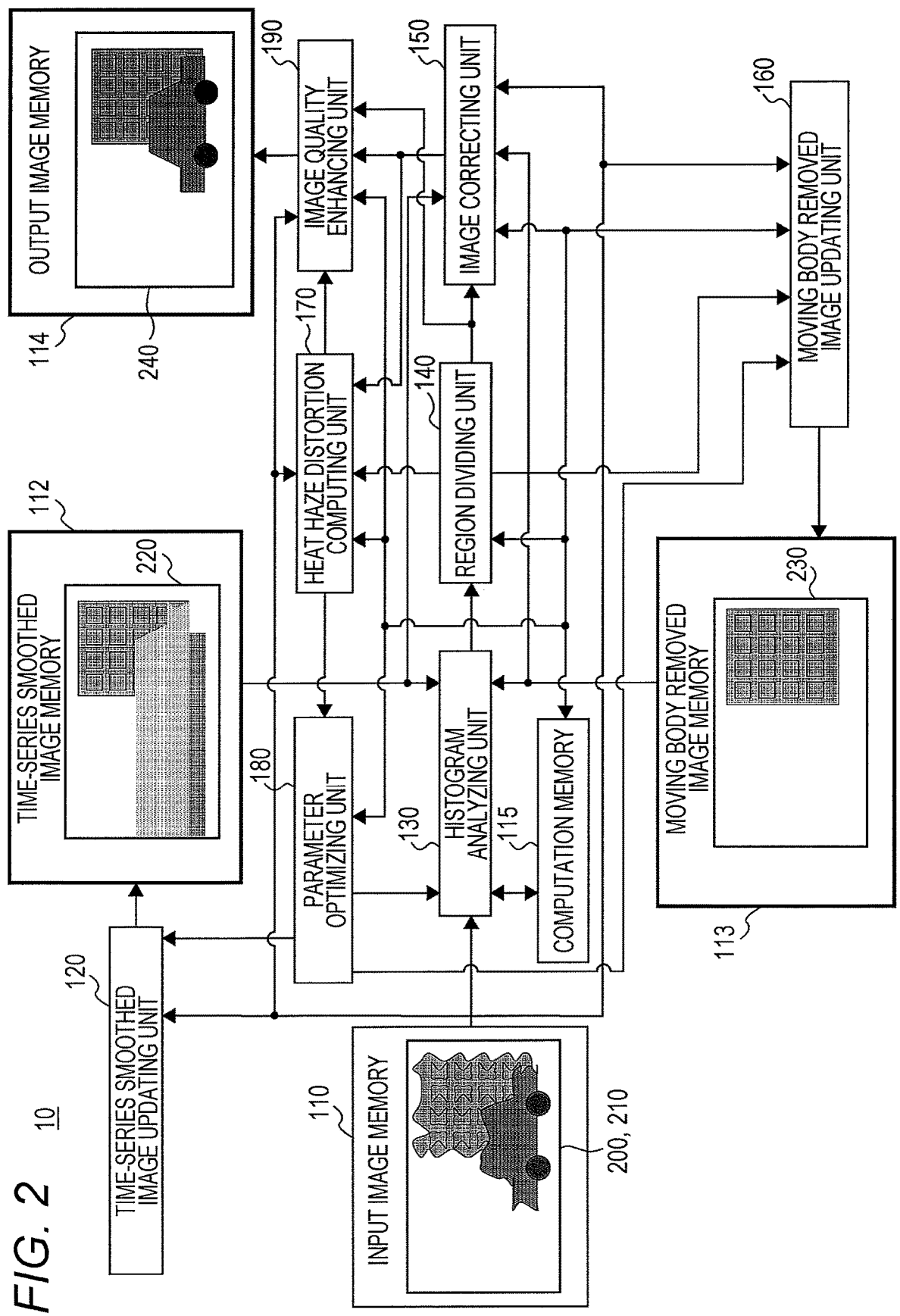
FIG. 2 is a block diagram illustrating a control configuration of an image processing apparatus 10 according to a first embodiment of the present invention.

Further, the parameter optimizing process S108 does not need to be performed at every time in the flow of FIG. 2.

Next, in step S108, the image quality enhancing unit 190 performs a resolution enhancing process.

Figure 18:
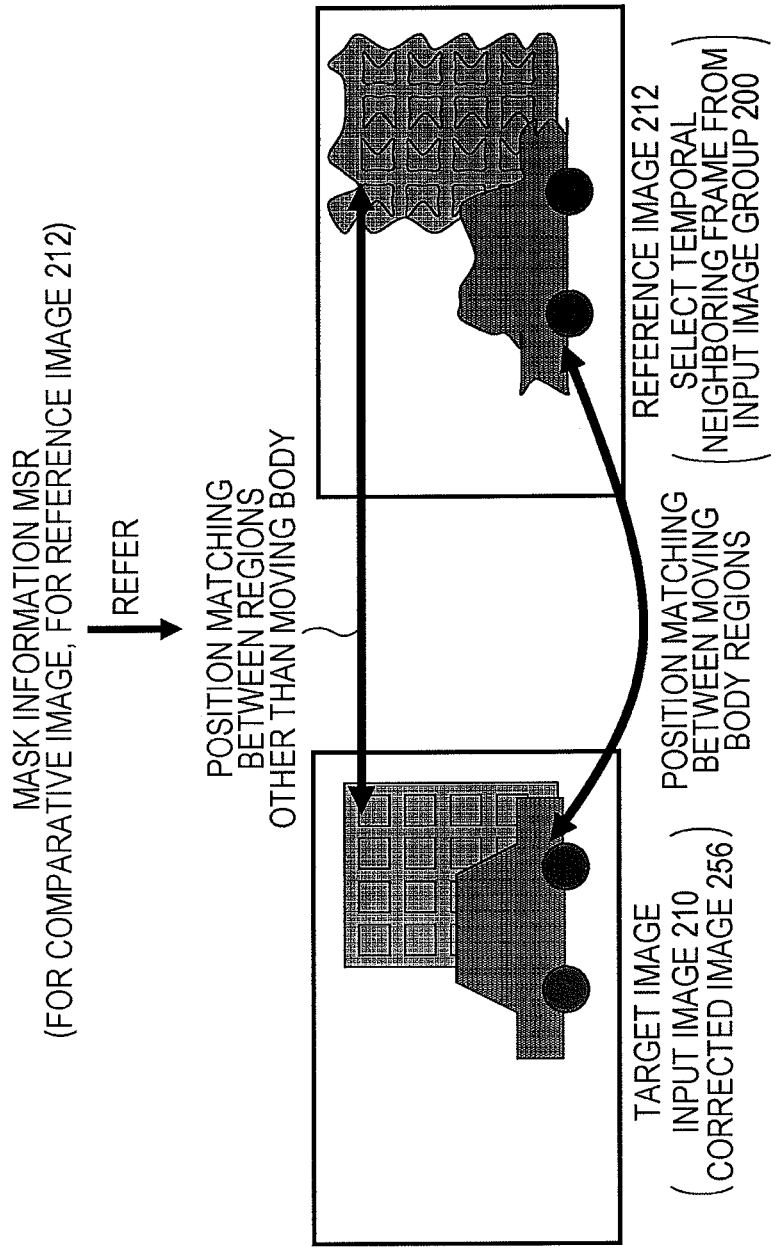
FIG. 18 is a conceptual diagram of position matching in a resolution enhancing process according to the first embodiment.

Referring to FIG. 18, the image quality enhancing unit 190 performs the super-resolution process using a temporal neighboring frame (except a frame identical to the input image 210 or the like) as a reference image 212 for the corrected image 256 and records a result thereof in the output image memory 114 as the output image 240. The image quality enhancing unit 190 may basically use several previous corrected images 256 held in the computation memory 155 as the reference image 212, but the output image 240 of a preceding frame which is held in the output image memory, the moving body removed image 230, or the input image group 200 of the input image memory 110 can be used instead thereof. Further, along with the reference image 212, mask information $M_{SR}$ of a relevant frame (temporal) is also held.

Generally, the super-resolution process which refers to a plurality of frames needs to perform partial position matching with all reference images with respect to a target image once. An existing position matching includes various methods, such as block matching, and requires sub-pixel accuracy and generally much processing amount.

Thus, in order to complete processing within a practical time, the present embodiment reduces the processing amount by using the mask information $M_{SR}$.

FIG. 18 illustrates an example of a position matching method according to the present embodiment.

The image quality enhancing unit 190 of the present example refers to the mask information $M_{SR}$ of the input image 210 or the corrected image 256, and the mask information $M_{SR}$ (if exists) of the reference image 212 and specifies a place in which a moving body is present on them respectively.

The image quality enhancing unit 190 performs partial position matching only between the moving body regions with respect to the moving body and performs partial position matching only between regions other than the moving body with respect to the regions other than the moving body.

In block matching, a last search result (amount of displacement) is frequently set as an initial search position (center of a search range). Since the search range is limited such that unnecessary search across another region is not performed, the processing amount is reduced. This is effective regardless of whether the movement amount for one frame time of the moving body is smaller or larger than a displacement amount of heat haze.

The image quality enhancing unit 190 performs the super-resolution process by performing partial position matching with fractional pixel accuracy on the target image and the reference image 212 and synthesizing (superimpose) the target image and the reference image 212 in based on a result of the position matching to generate the output image 240.

The super-resolution process may use any method, and it is preferable to use a reconstruction method of modeling factors of image deterioration, such as added movement or blurring, until an observation image is generated from a high-resolution image and estimating a high-resolution image using a normalization method, such as MAP estimation or bilateral total variation (BTV) method. For the reconstruction method, reference can be made to "M. Tanaka and M. Okutomi, "A Fast Algorithm for Reconstruction-Based Super-Resolution and Its Accuracy Evaluation", Proceedings of IEICE, D-II vol. J88-D-II, No. 11, pp. 2200-2209, 2005. (IEICE); November, 2005".

Alternatively, as the simplest method, there is a method of setting the target image to the latest output image 240 and the reference image 212 to the latest corrected image 256 (one piece). In this method, the latest input image one frame later than the target image included in the input image group 210 is provided additionally and there may be two reference images 212.

As above, the image quality enhancing process according to the first embodiment of the present invention is ended.

Further, another image may be used as the target image or the reference image. For example, the image quality enhancing unit 190 may directly select the target image from the input image group 200 and use the time-series smoothed image 220 or the moving body removed image 230 as the reference image. When the mask information $M_{SR}$ is only used, a method of using no the corrected images 256 and 254 is considered. Also, the filter information 255 is referred to, and the super-resolution process may be omitted for the plane region in which the edge strength is weak.

Also, the heat haze distortion computing unit 170 may calculate the heat haze distortion level $D_L$ by using a result of the position matching process by the image quality enhancing unit 190. The result of the position matching process may be used for a wide range of use, such as analysis of movement of a moving body or template matching for object recognition.

Also, the output image 240 stored in the output image memory 114 may be read by another application, may be accumulated and recorded in a recording medium as an image file, may be output onto a network, or may be output to a display device so as to be viewed by a user.

According to the above-described configuration, the following effects can be obtained.

First, in the related art 1 and the related art 2, preferable effects can be obtained in a region in which a moving body is not present but, there are problems that afterimage phenomenon in which, in the region through the moving body, the moving body is unintentionally superimposed on the region occurs has been passed and image quality is recued.

In this regard, the image processing apparatus 10 according to the first embodiment of the present invention uses a histogram and computes a histogram difference regarding the time-series smoothed image obtained by smoothing the input image using a temporal neighboring image and extracts a small portion of the difference as the moving body region. Thereafter, heat haze correction is performed by performing an appropriate filter process on respective regions and performing synthesis of regions.

By the above-described process, the image processing apparatus 10 of the present embodiment can correct deformation of a subject to be viewed, due to heat haze or missing of resolution without deteriorating the corrected image even when the moving body is present and improves quality of an image in which heat haze correction is performed with a practical computation amount. Therefore, it is possible to allow a subject that shakes irregularly to be viewed in a stopped state and provide an image having a high visibility which is suitable for image monitoring by a person.

Also, a moving body separating method by region division of the present embodiment may be used for purposes other than image correction. For example, it is possible to automatically detect an intruder within a monitored image in which distortion due to heat haze is included, and analyze a region identified as a moving body in a system which automatically identifies the number of an entering vehicle, thereby reducing a processing amount.

EXAMPLE 2

<Second Embodiment>
[Configuration of Image Processing Apparatus 11]

Figure 19:
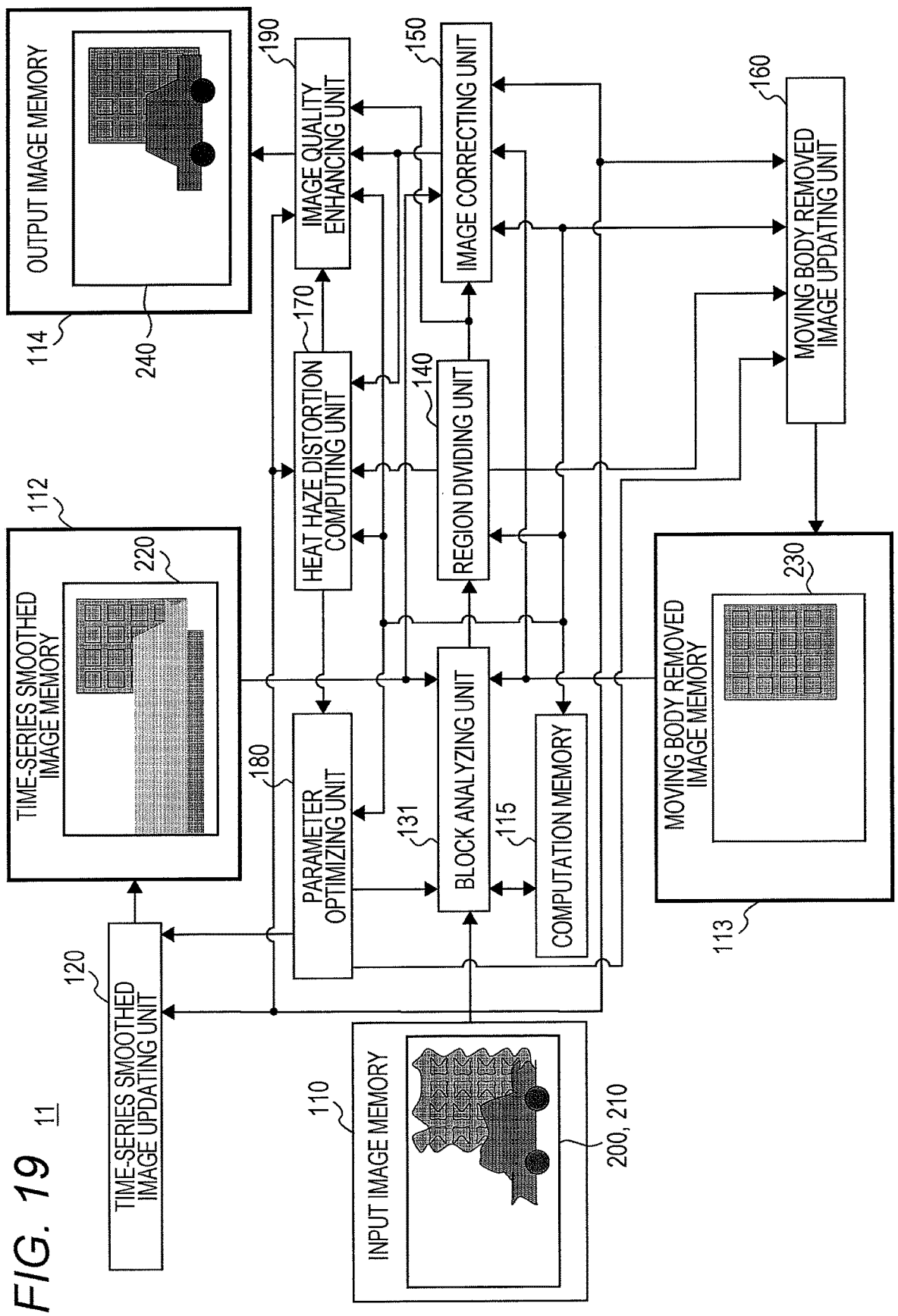
FIG. 19 is a block diagram illustrating a control configuration of an image processing apparatus 11 according to a second embodiment of the present invention.
Figure 20:
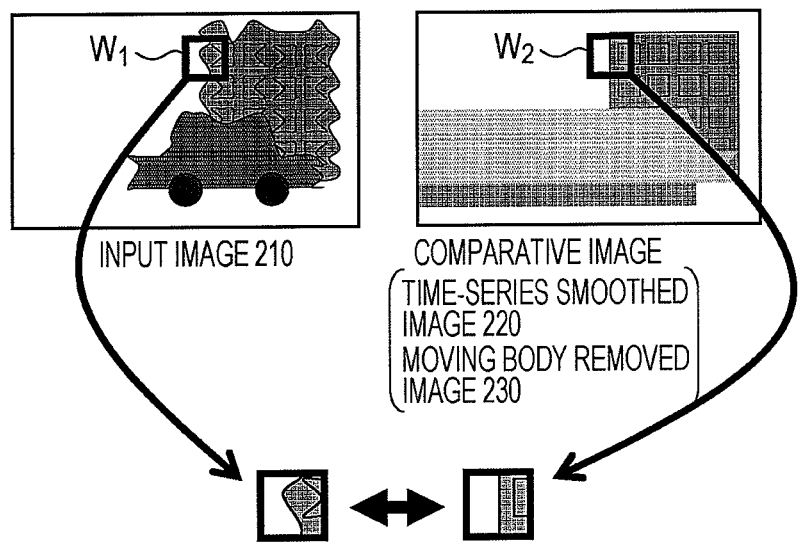
FIG. 20 is a conceptual diagram for computation of similarity information between images according to the second embodiment.

Next, a control configuration of the image processing apparatus 11 according to the second embodiment of the present invention will be described with reference to FIG. 19. In FIG. 19, the same reference numerals as the image processing apparatus 10 according to the first embodiment of FIG. 2 indicate the same processing parts. Specifically, the image processing apparatus 11 includes a block analyzing unit 131 (similarity information calculating device or block analyzing device) that is the similarity information calculating unit, instead of the histogram analyzing unit 130 (FIG. 2) of the image processing apparatus 10.

The block analyzing unit 131 calculates an evaluated cost representing a difference between images as similarity information between images in a pixel unit, respectively with respect to a combination of the input image 210 and the time-series smoothed image 220 and a combination of the input image 210 and the moving body removed image 230, similarly to the histogram analyzing unit 130 of the first embodiment. However, the block analyzing unit 131 differs from the histogram analyzing unit 130 in that the block analyzing unit 131 calculates a difference between pixel values at the same coordinates, instead of a difference between histograms.

Further, processing other than the block analyzing unit 131 is the same as the image processing apparatus 10 according to the first embodiment, and a description thereof is omitted.

FIG. 10 illustrates a method by which the block analyzing unit 131 computes a similarity between images in a certain region.

In this case, the block analyzing unit 131 evaluates pixel values of windows W1 and W2 which have the same coordinates and the same size of 32×32 pixels, for example, in the input image 210 and a comparative image, and computes a difference value $D_{W1, W2}$ between the windows.

In this case, as the comparative image, that is, as an image that is a comparative target of the input image 210, the time-series smoothed image 220 or the moving body removed image 230 can be used similarly to the first embodiment.

It is preferable that a method of evaluating a pixel value performs computation by adding pixel value differences at the same coordinates within a window, as expressed in the following Formula (12).

Formula (12) is illustrated as being applied to a case of setting the time-series smoothed image 220 to the comparative image, but is also applied to the moving body removed image 230 similarly.

[Mathematical formula 12]

$$D_{W1,W2} = \sum_{i,j \in W_1, W_2} \mathit{Diff}(p(i,j), a(i,j)) \qquad \text{Formula (12)}$$

Where Diff (x, y) denotes a difference between a pixel value x and a pixel value y.

It is preferable that, as the method of computing the difference, the block analyzing unit 131 uses, for example, an absolute difference expressed in Formula (13) or a squared difference expressed in Formula (14).

[Mathematical Formula 13]

$$\text{Diff}(x,y)=|x-y| \qquad \text{Formula (13)}$$

[Mathematical Formula 14]

$$\text{Diff}(i,j)=(x-y)^2 \qquad \text{Formula (14)}$$

Also, the block analyzing unit 131 can compute a difference of average values of pixel values within the window as a difference between windows, as expressed in the following Formula (15).

Thus, computation considering deformation of a subject due to heat haze is possible.

[Mathematical Formula 15]

$$D_{W1,W2}=\text{Diff}(\text{AVE}(W_1),\text{AVE}(W_2)) \qquad \text{Formula (15)}$$

Where AVE (W1 or W2) represents an average value of all pixels included in the window W1 or W2.

Further, when computing a different between windows, the block analyzing unit 131 may use a feature value indicating characteristics of pixels within the window, for example, a center value or a most frequent value, rather than using the average value.

In the second embodiment of the present invention, the block analyzing unit 131 can compute the evaluated cost $C_X$ indicating a difference between images for each pixel based on the difference $D_{W1,W2}$ between windows calculated according to the above-described method, like the inter-image similarity evaluating process of the first embodiment.

That is, the block analyzing unit 131 may repeatedly compute the difference between windows while moving a window around the target pixel as illustrated in FIG. 6, or may set a window such that the target pixel is disposed at a center and compute the difference as illustrated in FIG. 7.

Although the embodiments of the present invention use comparison of histograms as a region division tool for dividing a region into the "moving body region", the "background region", the "quasi moving body region" and the like from above descriptions of the embodiments, it is understood that various methods, such as comparison of pixel values can be used. Generally speaking, the embodiments of the present invention have the following common tendencies.

The region dividing device uses an original input image without relying on other processing, or past results as much as possible. This essentially contributes to robust operation. When an output behavior is caused to be changed even a bit due to a moving body and heat haze, all image processing devices can be used.

Suppression of disturbances other than heat haze is based on smoothing in time domain. Since this does not require estimation of displacement caused by heat haze, there is no risk of considerable reduction in image quality due to an error in estimation. This is effective to a stationary background.

Resolution which is reduced in smoothing is recovered by supplementarily using the super-resolution process. The super-resolution process is not a factor of considerably deteriorating image quality due to the super-resolution process itself. When the super-resolution process is used in the moving body region, it can be expected to prevent distortion caused by heat haze.

The present invention can be mentioned as following.

The image processing apparatus 10 or 11 according to an aspect of the present invention includes: the input image memory 110 for holding the input image 210; the time-series smoothed image memory 112 for holding the time-series smoothed image 220 obtained by smoothing all pixels of a screen by using a input image group 200 of a plurality of temporal neighboring input images; the moving body removed image memory 113 for storing the moving body removed image 230 obtained by performing a time-series smoothing process on an image obtained by removing the moving body from the input image; the time-series smoothed image updating unit 120 that updates the time-series smoothed image by using the input image 210; the histogram analyzing unit 130 that generates respective histograms for partial images of two types of images and evaluates similarity between images by computing a difference between the histograms or the block analyzing unit 131 that evaluates similarity between images by computing a difference between pixels for each block; a region dividing unit 140 that performs region division based on an error computed by the histogram analyzing unit 130 or the block analyzing unit 131; the image correcting unit 150 that corrects an image based on a result of region division by the region dividing unit 140; the moving body removed image updating unit 160 that performs a process of updating the moving body removed image 230 using the input image based on the result of region division by the region dividing unit 140; the heat haze distortion computing unit 170 that computes a strength of distortion due to heat haze based on results of region division and image correction; the parameter optimizing unit 180 that optimizes various types of parameters according to the strength of distortion due to heat haze; and the image quality enhancing unit 190 that performs a super-resolution process based on the results of region division and image correction.

The image processing method includes computing similarity between a target image and a time-series smoothed image obtained by performing smoothing using a plurality of temporal neighboring images and extracting a region in which the similarity is low as a moving body.

The image processing method includes extracting a region through which the moving body has been passed based on the similarity regarding the target image by using a moving body removed image obtained by performing time-series smoothing on portions other than the region extracted as the moving body.

The image processing method includes generating histograms for respective windows of the input image and the target image, computing similarity between images by computing a difference between the histograms, and performing region division.

The image processing method includes dividing the input image into two or more types of regions and performing image correction by performing different processes on the respective regions.

The image processing method includes applying a spatial-direction smoothing filter to the moving body region and applying a temporal-direction smoothing filter to a region other than the moving body.

The image processing method includes, when region division is performed by using evaluated values computed in a pixel unit or in a region unit, setting two or more types of threshold parameters and performing region division on a region placed spatially adjacent to a region having an evaluated value equal to or greater than a high threshold by using a low threshold, and otherwise, performing region division by using the high threshold.

The image processing method includes performing region division on a region placed spatially adjacent to a region having an evaluated value equal to or less than a low threshold by using a high threshold, and otherwise, performing region division by using the low threshold when the region division is performed.

INDUSTRIAL APPLICABILITY

The present invention can be widely applied to distortion which is temporally changed in an image upon, for example, waves on the water, shaking of trees, fog in the atmosphere, or underwater photographing, other than heat haze, and is useable in apparatus and methods that handle image series generated by imaging an intensity distribution of electromagnetic waves or a particle beam.

REFERENCE SIGNS LIST 10, 11 image processing apparatus
110 input image memory
112 time-series smoothed image memory
113 moving body removed image memory
114 output image memory
115 computation memory
120 time-series smoothed image updating unit
130 histogram analyzing unit
131 block analyzing unit
140 region dividing unit
150 image correcting unit
160 moving body removed image updating unit
170 heat haze distortion computing unit
180 parameter optimizing unit
190 image quality enhancing unit
200 input image group
210, 1200-1 to 1200-n input image
212 reference image
220, 1220 time-series smoothed image
230 moving body removed image
240 output image
252 cost computation information
253 mask setting
254, 256 corrected image
255 filter information
257 distortion strength image
310, 311, 320, 321, 330, 1250 region
410, 420, 430, 440, 450, 460, 470 histogram
610, 620, 710, 720, 730, 770, 780, 790, 810, 820 pixel
760, 830, portion of mask information $M_{SR}$
1010, 1020, 1030, 1110, 1120, 1130 pixel group

What is claimed is:

1. An image processing device for reducing degradation in visual images, comprising:
   a smoothed image updater generating a temporally-smoothed image from images close to an input image in time;
   an histogram analyzer generating histograms of the input image, the temporally-smoothed image and an object-removed image in respective windows centered at positions to be compared each other and generating similarity information of images based on difference of the histograms;
   a region divider dividing the input image, depending on the similarity information, into a region of moving object, a region of background and a region of quasi-moving object where through an moving object just passed;
   an object-removed image updater generating the object-removed image by moving-averaging only in the region of background and a region of quasi moving object of the input images or by choosing a median of pixel values from the images close to the input image; and
   an image corrector generating a synthesized image by combining the input image, the temporally-smoothed image and the object-removed image chosen according to the regions and providing a corrected image by applying adaptive filter in space domain to the synthesized image,
   wherein the histogram analyzer generates the similarity information including a first evaluation cost based on difference between the histogram of the input image and the histogram of the temporally-smoothed image and a second evaluation cost based on difference between the histogram of the input image and the histogram of the object-removed image, and
   wherein the region divider classifies a region where both the first evaluation cost and the second evaluation cost are higher than a threshold as the region of moving object, a region where the second evaluation cost is higher than the first evaluation cost as the region of background and the rest as the region of quasi moving object.

2. The image processing device of claim 1,
   wherein the region divider divides the image with two threshold of higher and lower values in a selective manner, and
   wherein the lower threshold is applied around a region of pixels with values higher than the higher threshold and the higher threshold is applied to others or wherein the higher threshold is applied around a region of pixels with values lower than the lower threshold and the lower threshold is applied to others.

3. The image processing device of claim 1,
   wherein the adaptive filter of the image corrector calculates edge strength of the input image or the synthesized image, classifies the image into three categories of frontier region, texture region and flat region depending on comparison of the edge strength with a first threshold and a second threshold and applies different filter processing for each categorized region to the synthesized image.

4. The image processing device of claim 3,
   wherein the adaptive filter of the image corrector applies to the frontier region an edge-smoothing filter smoothening contours, to the texture region a bilateral filter suit for smoothing while saving contours and to the flat region a Gaussian filter defocusing softly.

5. The image processing device of claim 1,
   wherein the image corrector chooses pixels of the input image in corresponding positions for the region of moving object, pixels of the temporally-smoothed image in corresponding positions for the region of background, and pixels of the object-removed image in corresponding positions for the region of quasi moving object.

6. The image processing device of claim 1, further comprising:
   a distortion calculator calculating strength of local turbulence in the input image; and
   a parameter optimizer controlling, depending on the strength of local turbulence, at least one of an interval of the positions to be compared, a size of the window and the threshold.

7. The image processing device of claim 1, further comprising:

a super-resolution processor locally aligning to and overlaying with the corrected image the images close to the input image in time, wherein the locally aligning is only processed within a same region and is not processed between different regions in the region of moving object, the region of background and the region of quasi-moving object.

8. The image processing device of claim 3, further comprising:

a super-resolution processor locally aligning to and overlaying with the corrected image the images close to the input image in time, wherein the locally aligning is only processed within a same region in the region of moving object, the region of background and the region of quasi-moving object and is not processed in the flat region where the edge strength becomes weaker.

9. The image processing device of claim 1, wherein the histogram analyzer calculates the difference of the histograms in a manner of summing plural version of difference of the histograms with different number of tones.

10. The image processing method of claim 9, wherein the dividing step includes dividing the image with two threshold of higher and lower values in a selective manner, and wherein the lower threshold is applied around a region of pixels with values higher than the higher threshold and the higher threshold is applied to others or wherein the higher threshold is applied around a region of pixels with values lower than the lower threshold and the lower threshold is applied to others.

* * * * *